US012620569B2

(12) United States Patent
Ueda et al.

(10) Patent No.: US 12,620,569 B2
(45) Date of Patent: May 5, 2026

(54) QUADRUPOLE-MASS-FILTER DRIVING METHOD AND QUADRUPOLE MASS SPECTROMETER

(71) Applicant: SHIMADZU CORPORATION, Kyoto (JP)

(72) Inventors: Manabu Ueda, Kyoto (JP); Shin Fujita, Kyoto (JP); Junichi Taniguchi, Kyoto (JP); Shinjiro Fujita, Kyoto (JP); Shiro Mizutani, Kyoto (JP)

(73) Assignee: SHIMADZU CORPORATION

( * ) Notice: Subject to any disclaimer, the term of this patent is extended or adjusted under 35 U.S.C. 154(b) by 368 days.

(21) Appl. No.: 18/400,531

(22) Filed: Dec. 29, 2023

(65) Prior Publication Data

US 2024/0331995 A1 Oct. 3, 2024

(30) Foreign Application Priority Data

Mar. 27, 2023 (JP) ................................ 2023-050237

(51) Int. Cl.
*H01J 49/42* (2006.01)
*H01J 49/02* (2006.01)

(52) U.S. Cl.
CPC ........ *H01J 49/4215* (2013.01); *H01J 49/022* (2013.01)

(58) Field of Classification Search
CPC ............................ H01J 49/4215; H01J 49/022
See application file for complete search history.

(56) References Cited

U.S. PATENT DOCUMENTS

| | | | | |
|---|---|---|---|---|
| 8,207,495 | B2 | 6/2012 | Mukaibatake et al. | |
| 10,705,048 | B2 * | 7/2020 | Okumura | H01J 49/4215 |
| 2003/0189171 | A1 * | 10/2003 | Londry | H01J 49/4225 250/282 |
| 2020/0027714 | A1 * | 1/2020 | Jiang | H01J 49/429 |
| 2020/0043716 | A1 * | 2/2020 | Taniguchi | H01J 49/4225 |

OTHER PUBLICATIONS

Shin Fujita, "Elucidation of ion motion in quadrupole mass spectrometer by Bloch function", International Journal of Modern Physics A, vol. 34, No. 36, (2019), pp. 1942004-1 to 1942004-17.

* cited by examiner

*Primary Examiner* — Nicole M Ippolito
(74) *Attorney, Agent, or Firm* — Muir Patent Law, PLLC

(57) ABSTRACT

A quadrupole mass filter (50) has a main-rod section (500) including rod electrodes arranged around a central axis C and a first pre-rod section (501) including pre-rod electrodes. Along with an RF voltage having a frequency corresponding to the m/z of an ion, DC voltage is applied to the pre-rod electrodes. The DC voltage and the amplitude of the RF voltage are determined so that a-value and q-value substantially satisfy the conditions that $a \neq 0$, $(\pi-\beta x \cdot \pi)N=\{(1/2)+m\}\pi$ and $\beta y \cdot \pi \cdot N=\{(1/2)+n\}\pi$, where m, n and N are natural numbers, with the X-axis direction connecting the centers of two rod electrodes facing each other across the central axis in a plane perpendicular to the central axis, the Y-axis direction connecting the centers of the other two rod electrodes in the plane, and βx and βy representing β values ($0<\beta<1$) related to a secular oscillation of an ion in the X and Y directions, respectively.

23 Claims, 11 Drawing Sheets

Y-AXIS DIRECTION

X-AXIS DIRECTION

QUADRUPOLE-MASS-FILTER DRIVING METHOD AND QUADRUPOLE MASS SPECTROMETER

TECHNICAL FIELD

The present invention relates to a quadrupole mass spectrometer employing a quadrupole mass filter as a mass separator, as well as a quadrupole-mass-filter driving method. In the present description, "quadrupole mass spectrometers" include not only a single type of quadrupole mass spectrometer but also other types of devices, such as a triple quadrupole mass spectrometer having two quadrupole mass filters arranged before and after a collision cell, or a quadrupole time-of-flight mass spectrometer having a quadrupole mass filter located before a collision cell and a time-of-flight mass analyzer located after the collision cell.

BACKGROUND ART

In a single type of quadrupole mass spectrometer, ions originating from a component (compound) contained in a sample are separated from each other by a quadrupole mass filter according to their mass-to-charge ratios (or more strictly, m/z in italic font, although they are referred to as "mass-to-charge ratios" or "m/z" in the present description), and the separated ions are detected by an ion detector. By repeating a mass scan over a predetermined m/z range in the quadrupole mass filter, a mass spectrum showing the relationship between m/z and ion intensity can be repeatedly obtained.

A quadrupole mass filter normally has a configuration in which four rod electrodes each of which has a cylindrical outer shape are arranged parallel to each other, being tangential to an inscribed circle of a predetermined radius whose center lies on a linear axis, as well as circumferentially spaced apart from each other at equal angular intervals (90 degrees). One pair of rod electrodes facing each other across the central axis, which is also an ion beam axis, is supplied with a voltage +(U+V cos ωt) in which a radiofrequency voltage (RF voltage) V cos ωt is superposed on a DC voltage U, while the other pair of rod electrodes is supplied with a voltage −(U+V co ωt) in which an RF voltage with the reversed phase, −V cos ωt, is superposed on a DC voltage having the reversed polarity, −U. By setting the voltage value U of the DC voltages and the amplitude value V of the RF voltages at their respective appropriate values according to the m/z while maintaining a specific relationship between them, the mass filter can selectively allow an ion having that m/z to pass through.

A disturbance of an electric field occurs around an end portion of the rod electrodes. This disturbance of the electric field causes a decrease in the transmittance of the ions. In order to reduce such a disturbance of the end-edge electric field, it is often the case that a pre-rod section is provided in front of a main-rod section formed by rod electrodes which have the ion-selecting effect. Typically, the pre-rods constituting the pre-rod section are rod electrodes each of which has a cylindrical outer shape having the same diameter as the main-rod electrodes and a shorter length in the direction of the ion beam axis. Since the pre-rod section is required to have the effect of converging ions having a wide range of m/z, it is normally the case that no DC voltage U is applied to the pre-rod electrodes, and an RF voltage having the same frequency as the RF voltage applied to the main-rod electrodes yet being smaller in amplitude is applied to the pre-rod electrodes.

CITATION LIST

Patent Literature

Patent Literature 1: U.S. Pat. No. 8,207,495 B

Non Patent Literature

Non Patent Literature 1: Shin Fujita, "Elucidation of ion motion in quadrupole mass spectrometer by Bloch function", *International Journal of Modern Physics A*, Vol. 34, No. 36, 2019

SUMMARY OF INVENTION

Technical Problem

In order to further improve the ion transmittance in a quadrupole mass spectrometer, a device described in Patent Literature 1 applies, to the pre-rod electrodes, a DC bias voltage in addition to the RF voltage having the same frequency as that of the main-rod electrodes and changes the voltage value of the DC bias voltage according to the m/z of the ion so as to control the number of times for the oscillation of the ion passing through the pre-rod electrodes. This technique improves the passage efficiency of the ion and enhances the detection sensitivity, independently of the m/z of the ion, as compared to the case where the DC bias voltage is fixed.

Meanwhile, in Non Patent Literature 1, one of the present inventors has reported an attempt to theoretically analyze the behavior of ions passing through a quadrupole mass filter, using a complex amplitude. According to the report, when ions are transferred from the auxiliary electric field created by the pre-rod section to which only the RF voltage is applied, to the main electric field created by the main-rod section, only a portion of the ions accepted into the auxiliary electric field can be appropriately transferred to the main electric field in the next section. In other words, this means that a considerable loss of ions occurs when the ions are transferred from the pre-rod section to the main-rod section. Accordingly, in order to improve the ion transmission efficiency in a quadrupole mass filter, it is important to improve the efficiency of the ion transfer from the pre-rod section to the main-rod section. However, no specific method for improving the efficiency of the ion transfer from the pre-rod section to the main-rod section is proposed in Non Patent Literature 1.

The previously described method disclosed in Patent Literature 1 is one possible method for improving the ion transmission efficiency. However, according to a study by the present inventors, the improving effect by the method is not always satisfactory, and an even further improvement is desired.

The present invention has been developed to solve those problems. Its primary objective is to enhance the analysis sensitivity in a quadrupole mass spectrometer by further improving the general ion transmission efficiency in a quadrupole mass filter.

Solution to Problem

One mode of the quadrupole-mass-filter driving method according to the present invention is a quadrupole-mass-filter driving method for operating a quadrupole mass filter which includes a main-rod section including four rod electrodes arranged so as to surround a central axis and a first pre-rod section including four rod electrodes arranged at a position on the upstream side of an ion stream from the main-rod section in the extending direction of the central axis, the method including:

a voltage calculation step for determining a DC voltage Up and the amplitude Vp of an RF voltage with which an a-value and a q-value which are parameters of a Mathieu equation expressing a motion of an ion and have relationships with βx and βy as expressed by equations (1) and (2) substantially satisfy the conditions that a≠0, (π−βx·π)N={(½)+m}π and βy·π·N={(½)+n}π, where m, n and N are natural numbers, the X-axis direction is defined as a direction connecting the centers of one pair of rod electrodes facing each other across the central axis in a plane perpendicular to the central axis, the Y-axis direction is defined as a direction connecting the centers of the other pair of rod electrodes in the plane, and βx and βy represent β values (0<β<1) related to a secular oscillation of an ion in the X and Y directions, respectively, with the relationship of Up and Vp with a and q defined by equations (3) and (4); and a voltage application step for applying, to each rod electrode of the main-rod section, a voltage in which a DC voltage according to the m/z of a target ion is superposed on an RF voltage according to the same m/z, as well as applying, to each rod electrode of the first pre-rod electrodes, a voltage in which an RF voltage ±Vp·cos ωt having an amplitude Vp and a frequency equal to the frequency of the RF voltage applied to the main-rod section is superposed on a DC voltage ±Up having a voltage value different from the DC voltage applied to the main-rod section, when an analysis is performed:

$$\beta_x^2 = a + \cfrac{q_x^2}{(\beta_x+2)^2 - a - \cfrac{q_x^2}{(\beta_x+4)^2 - a - \cfrac{q_x^2}{(\beta_x+6)^2 - a - \dots}}} + \cfrac{q_x^2}{(\beta_x-2)^2 - a - \cfrac{q_x^2}{(\beta_x-4)^2 - a - \cfrac{q_x^2}{(\beta_x-6)^2 - a - \dots}}} \quad (1)$$

$$\beta_y^2 = -a + \cfrac{q_y^2}{(\beta_y+2)^2 + a - \cfrac{q_y^2}{(\beta_y+4)^2 + a - \cfrac{q_y^2}{(\beta_y+6)^2 + a - \dots}}} + \cfrac{q_y^2}{(\beta_y-2)^2 + a - \cfrac{q_y^2}{(\beta_y-4)^2 + a - \cfrac{q_y^2}{(\beta_y-6)^2 + a - \dots}}} \quad (2)$$

$$a = \frac{8eUp}{mr_0^2\omega^2} \quad (3)$$

$$q = \frac{4eVp}{mr_0^2\omega^2} \quad (4)$$

where e is the charge of the ion, m is the mass of the ion, $r_0$ is the distance from the central axis to each rod electrode of the first pre-rod electrode, and ω is the angular frequency of the RF voltage.

One mode of the quadrupole mass spectrometer according to the present invention includes:

a quadrupole mass filter which includes a main-rod section including four rod electrodes arranged so as to surround a central axis and a first pre-rod section including four rod electrodes arranged so as to surround the central axis at a position on the upstream side of an ion stream from the main-rod section along the central axis;

a main voltage application section configured to apply, to each rod electrode of the main-rod section, a voltage in which a DC voltage according to the m/z of an ion is superposed on an RF voltage according to the same m/z, so as to create a quadrupole electric field in the main-rod section; and an auxiliary voltage application section configured to apply, to each rod electrode of the first pre-rod section, a voltage in which an RF voltage having the same frequency as the aforementioned RF voltage is superposed on a DC voltage having a voltage value different from the DC voltage applied to the main-rod section, so as to create a quadrupole electric field in the first pre-rod section, where the DC voltage value Up and the amplitude value Vp of the RF voltage applied by the auxiliary voltage application section are determined so that the values of a and q which are parameters of a Mathieu equation expressing a motion of an ion and have relationships with Up and Vp as expressed by the aforementioned equations (3) and (4) as well as relationships with βx and βy as expressed by the aforementioned equations (1) and (2), substantially satisfy the conditions that a≠0, (π−βx·π)N={(½)+m}π and βy·π·N={(½)+n}π, where m, n and N are natural numbers, the X-axis direction is defined as a direction connecting the centers of one pair of rod electrodes facing each other across the central axis in a plane perpendicular to the central axis, the Y-axis direction is defined as a direction connecting the centers of the other pair of rod electrodes in the plane, and βx and βy represent β values (0<β<1) related to a secular oscillation of an ion in the X and Y directions, respectively.

Advantageous Effects of Invention

According to the previously described modes of the present invention, the loss of ions which occurs when the ions that have passed through the pre-rod section enter the main-rod section can be decreased as compared to the conventional case, so that the general ion transmission efficiency in the quadrupole mass filter can be improved. This increases the amount of ions to be sent from the quadrupole mass filter to the subsequent device, such as an ion detector or collision cell, and thereby enhances the analysis sensitivity.

DESCRIPTION OF EMBODIMENTS

The quadrupole mass spectrometer according to the present invention can be generally applied to any mass spectrometer employing a quadrupole mass filter as a mass separator. Accordingly, the quadrupole mass spectrometer according to the present invention includes a single type of quadrupole mass spectrometer, triple quadrupole mass spectrometer, quadrupole time-of-flight mass spectrometer (and the likes).

[Schematic Configuration and Operation of Mass Spectrometer According to One Embodiment]

A triple quadrupole mass spectrometer as one embodiment of the present invention is hereinafter described with reference to the attached drawings.

Figure 1:
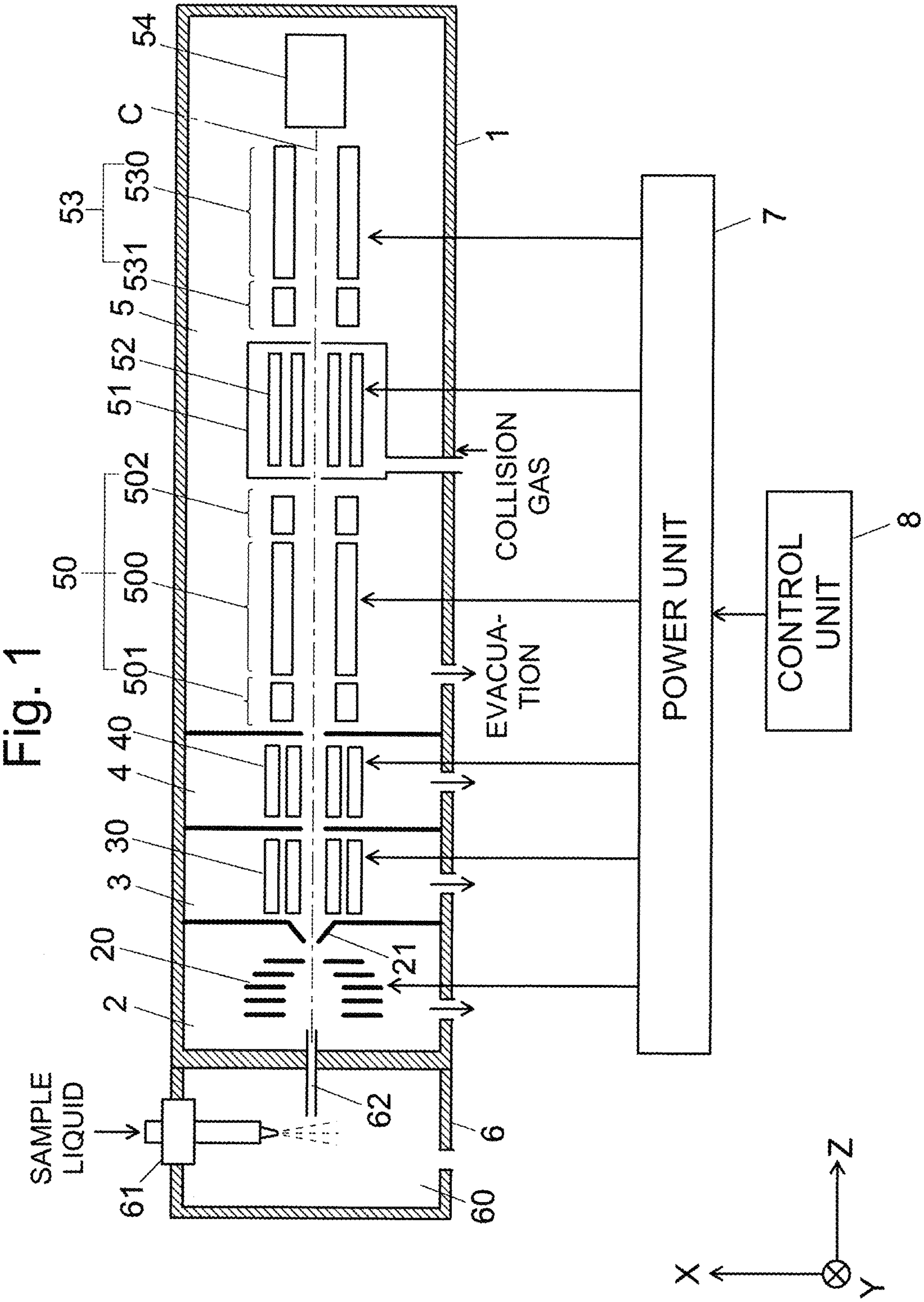
FIG. 1 is a schematic overall configuration diagram of a mass spectrometer as one embodiment of the present invention.

FIG. 1 is a schematic overall configuration diagram of the mass spectrometer according to the present embodiment. This mass spectrometer is a triple quadrupole mass spectrometer employing an atmospheric pressure ion source. In most cases, it is combined with a liquid chromatograph and is used as a liquid chromatograph mass spectrometer (LC-MS). For convenience of the description, the three axes of X, Y and Z orthogonal to each other are defined as shown in FIG. 1.

In the present mass spectrometer, an ionization unit 6 within which an ionization chamber 60 is provided is located in front of (i.e., on the upstream side in the flight path of the ions from) a vacuum chamber 1. The inner space of the vacuum chamber 1 is divided into four compartments: a first intermediate vacuum chamber 2, second intermediate vacuum chamber 3, third intermediate vacuum chamber 4, and analysis chamber 5. The ionization chamber 60 is at substantially atmospheric pressure, while the first intermediate vacuum chamber 2 as well as the subsequent chambers are individually evacuated with a rotary pump and a turbomolecular pump (not shown). Thus, this mass spectrometer has the configuration of a multi-stage differential pumping system with the degree of vacuum increased in a stepwise manner from the ionization chamber 60 through the first, second and third intermediate vacuum chambers 2, 3 and 4 to the analysis chamber 5.

Within the ionization chamber 60, an electrospray ionization (ESI) probe 61 is located. The ionization chamber 60 communicates with the first intermediate vacuum chamber 2 through a desolvation tube 62 which is to be heated to a high temperature. An ion guide 20, called a "Q-Array", is located within the first intermediate vacuum chamber 2. The first intermediate vacuum chamber 2 communicates with the second intermediate vacuum chamber 3 through a small hole formed at the apex of a skimmer 21. Within the second and third intermediate vacuum chambers 3 and 4, multipole ion guides 30 and 40 are located, respectively, each of which consists of a plurality of rod electrodes arranged so as to surround an ion beam axis C (the central axis of the flight path of the ions) extending in the Z-axis direction.

Within the analysis chamber 5, the following devices are arranged along the ion beam axis C: a front quadrupole mass filter 50; a collision cell 51 including an ion guide 52 for transporting ions while converging them; a rear quadrupole mass filter 53; and an ion detector 54 configured to produce a detection signal representing an ion intensity corresponding to the amount of ions it has received.

Under the control of a control unit 8, predetermined voltages are respectively applied from a power unit 7 to the ESI probe 61, desolvation tube 62, ion guides 20, 30, 40 and 52, quadrupole mass filters 50 and 53 as well as other related elements.

It should be noted that some of the wirings for applying voltages are omitted so as to prevent the drawing from being complicated. The detection signal produced by the ion detector 54 is converted into digital data by an analogue-to-digital converter (not shown) and is sent to a data processing unit (not shown). In most cases, the data processing unit and the control unit 8 are realized by using a general-purpose personal computer as a hardware resource, with at least some of their functions realized by executing, on the computer, a piece of software (computer program) installed on that same computer.

A typical analysis operation in the mass spectrometer according to the present embodiment is hereinafter schematically described.

When a sample liquid is introduced into the ESI probe 61, electrically charged droplets of the sample liquid are sprayed from the tip of the ESI probe 61 into the ionization chamber 60. The charged droplets are atomized by colliding with the ambient gas, with the solvent in those droplets being vaporized. Through this process, the component molecules contained in the sample liquid are ionized. The generated ions are suctioned into the desolvation tube 62 and sent to the first intermediate vacuum chamber 2 along with the charged droplets from which the solvent has insufficiently vaporized.

The vaporization of the solvent in the droplets is further promoted within the desolvation tube 62, whereby the generation of the ions originating from the sample component is further promoted.

The ions introduced into the first intermediate vacuum chamber 2 are focused onto an area around the small hole of the skimmer 21 due to the effect of the electric field created by the ion guide 20 and enter the second intermediate vacuum chamber 3 through the small hole. Being converged due to the effect of the electric fields created by the ion guides 30 and 40, those ions are sequentially transferred and enter the analysis chamber 5.

In the analysis chamber 5, the ions originating from the sample component enter the front quadrupole mass filter 50, where only an ion having an m/z corresponding to the voltage applied to the rod electrodes constituting the front quadrupole mass filter 50 is allowed to pass through the same mass filter 50. The ion which has passed through the front quadrupole mass filter 50 (precursor ion) enters the collision cell 51, where the ion collides with a collision gas introduced in the collision cell 51 and undergoes collision induced dissociation (CID). The various kinds of product ions resulting from the CID are transported by the ion guide 52 while being converged and enter the rear quadrupole mass filter 53. Among the incident product ions, only an ion having an m/z corresponding to the voltage applied to the rod electrodes constituting the rear quadrupole mass filter 53 is allowed to pass through the same mass filter 53 and enter the ion detector 54. The ion detector 54 produces an ion detection signal having a magnitude corresponding to the amount of ions it has received.

The previously described mass spectrometer can detect a specific product ion originating from a specific component molecule in a sample by operating each of the front and rear quadrupole mass filters 50 and 53 to selectively allow an ion having a specific m/z to pass through the filter.

As shown in FIG. 1, the front quadrupole mass filter 50 consists of three sections separated from each other along the ion beam axis C. That is to say, the mass filter 50 includes a central main-rod section 500, a pre-rod section 501 located in front of the main-rod section 500 (on the side from which ions come) and a post-rod section 502 located at the back of the main-rod section 500 (on the side toward which ions exit). On the other hand, the rear quadrupole mass filter 53 includes a main-rod section 530 and a pre-rod section 531 located in front of the main-rod section 530. The main-rod sections 500 and 530 in the quadrupole mass filters 50 and 53 have the function of selecting ions according to their m/z, while the pre-rod sections 501 and 531 as well as the post-rod section 502 have the main function of reducing the disturbance of the end-edge electric fields of the main-rod sections 500 and 530.

[Configuration of Quadrupole Mass Filter]

The following description deals with the front quadrupole mass filter 50 as an example. The description is similarly applicable to the rear quadrupole mass filter 53.

Figure 2:
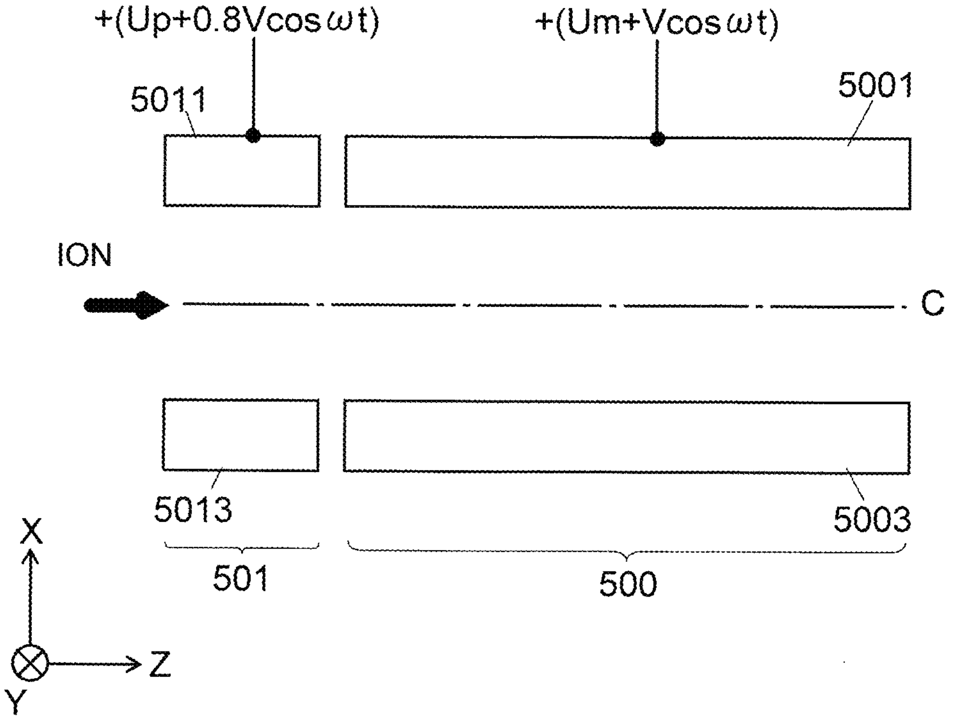
FIG. 2 is a configuration diagram of a front quadrupole mass filter in the mass spectrometer according to the present embodiment.
Figure 3:
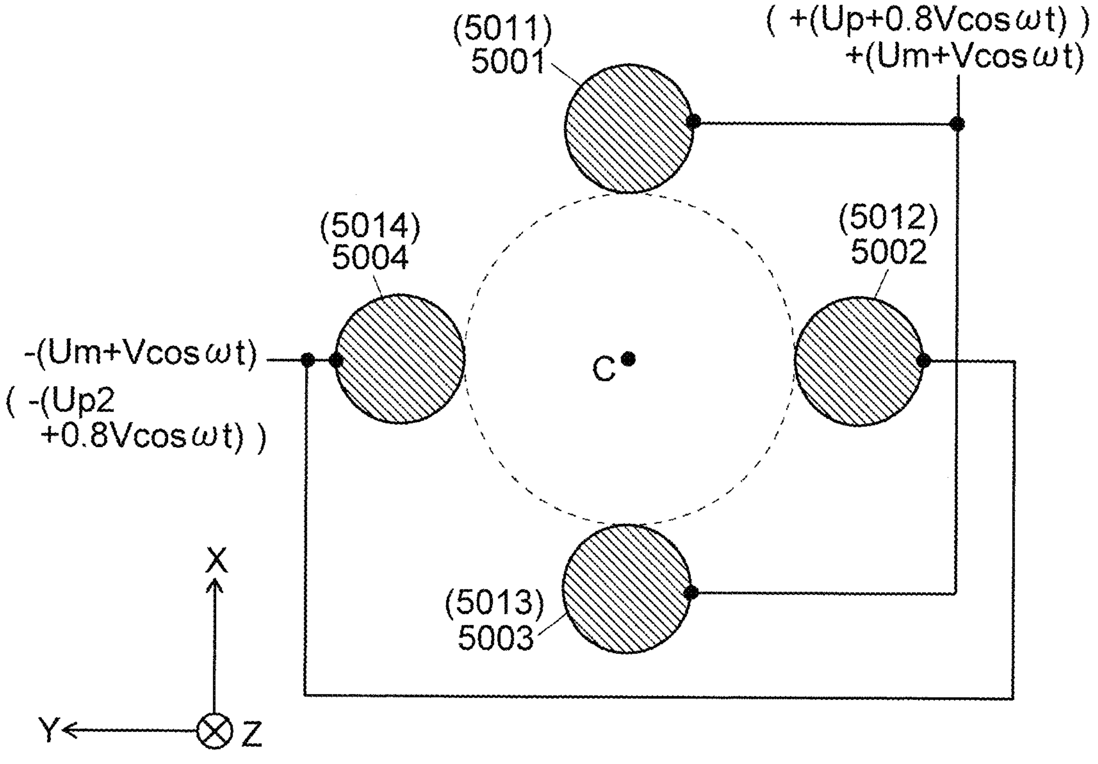
FIG. 3 is a schematic sectional view at a plane orthogonal to the central axis of the front quadrupole mass filter shown in FIG. 2.

A characteristic configuration and operation of the quadrupole mass filter 50 is described with reference to FIGS. 2 and 3. FIGS. 2 and 3 are diagrams showing the configuration of a portion which roughly corresponds to the first half of the front quadrupole mass filter 50, where FIG. 2 is an end view at the X-Z plane containing the ion beam axis C, and FIG. 3 is an end view at the X-Y plane orthogonal to the ion beam axis C.

The main-rod section 500 includes four rod electrodes 5001, 5002, 5003 and 5004 each of which has a cylindrical outer shape. The four rod electrodes 5001-5004 are arranged parallel to each other, being tangential to an inscribed circle of a predetermined radius whose center lies on the ion beam axis C, as well as at equal angular intervals (90 degrees) in the circumferential direction around the ion beam axis C. Among the four rod electrodes 5001-5004, two rod electrodes 5001 and 5003 facing each other across the ion beam axis C in the X-axis direction are supplied with a voltage of +(Um+V·cos ωt) from the power unit 7 under the control of the control unit 8, while two rod electrodes 5002 and 5004 facing each other across the ion beam axis C in the Y-axis direction are supplied with a voltage of −(Um+V·cos ωt) from the power unit 7. Here, Um is a DC voltage for ion selection, and V·cos ωt is an RF voltage for ion selection. Um and V change according to the m/z while having a specific relationship with each other. Additionally, a DC bias voltage is commonly applied to all of those rod electrodes, as will be described later. The term "DC voltage" as simply mentioned refers to the DC voltage for ion selection, i.e., the DC voltage having different polarities between the rod electrodes neighboring each other in the circumferential direction; this should be distinguished from the DC bias voltage.

Similar to the main-rod section 500, the pre-rod section (first pre-rod section) 501 also includes four pre-rod electrodes 5011, 5012, 5013 and 5014 each of which has a cylindrical outer shape. The shape and arrangement of the four pre-rod electrodes 5011-5014 are identical to those of the main-rod electrodes 5001-5004 of the main-rod section 500 except for their shorter axial length. The shape and arrangement of the rod electrodes of the pre-rod section 501 and the main-rod section 500 are similar to those of a quadrupole mass filter in a conventional mass spectrometer.

The pre-rod electrodes 5011-5014 of the pre-rod section 501 are supplied with voltages ±(Up+0.8V·cos ωt) from the power unit 7 under the control of the control unit 8, where the voltages are generated by superposing RF voltages (±Vp·cos ωt=+0.8V·cos ωt) which are equal to RF voltages ±V·cos ωt multiplied by a predetermined constant (in the present example, 0.8, although this is a mere example) on DC voltages ±Up whose voltage values are different from the DC voltage ±Um. That is to say, unlike the conventional and common type of device in which no DC voltage corresponding to Um is applied to the pre-rod electrodes of the pre-rod section while an RF voltage corresponding to V·cos ωt is applied, the mass spectrometer according to the present embodiment applies the DC voltage Up corresponding to Um to the pre-rod electrodes 5011-5014 in addition to the RF voltage Vp·cos ωt corresponding to V·cos ωt. By appropriately setting the (absolute) voltage value of this DC voltage Up, the efficiency with which the ions that have exited the pre-rod section 501 enter the main-rod section 500 can be improved, or in other words, the loss of the ions can be reduced, so that the general ion transmittance can be improved.

The DC voltage Up, as well as the DC voltage Um, amplitude V (and Vp) of the RF voltages and other related values, can be calculated by a computer substantially acting as the control unit 8. Alternatively, those values may be calculated by a digital signal processor (or the like) for mathematical operations in place of the computer (i.e., the functions realized by executing a program). Another possible configuration is such that an independent computer which is not connected to the mass spectrometer calculates appropriate values in place of the computer connected to the mass spectrometer in order to control this mass spectrometer, and those values are saved in a memory of the control unit 8, allowing the control unit 8 to appropriately select those values and control the power unit 7. A method for determining the voltage value of the DC voltage Up and its specific example will be described later.

[Configuration of A Variation of Quadrupole Mass Filter]

Figure 4:
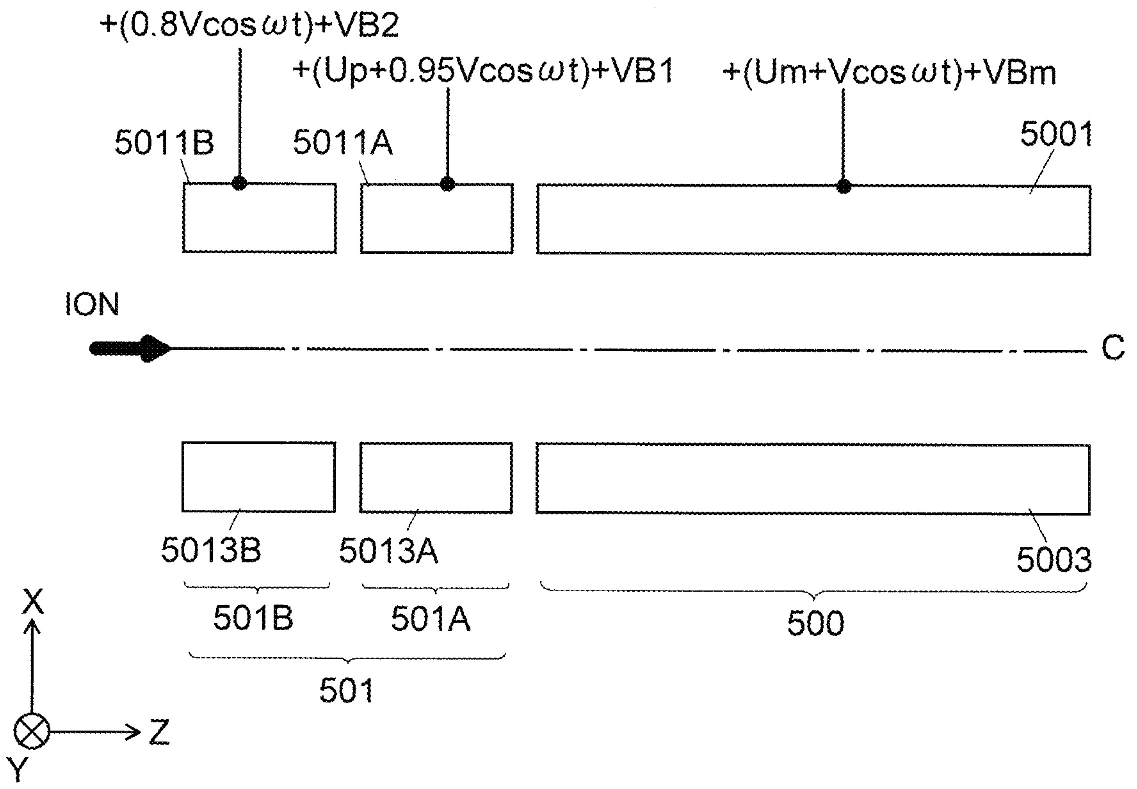
FIG. 4 is a configuration diagram of a variation of the front quadrupole mass filter in the mass spectrometer according to the present embodiment.

The pre-rod section 501 shown in FIG. 2 has a single-stage configuration. A two-stage configuration with the pre-rod section 501 divided into two sections along the ion beam axis C as shown in FIG. 4 is also possible. In this configuration, the pre-rod electrodes 5011A-5014A of the first pre-rod section 501A located immediately before the main-rod section 500 are supplied with voltages ±(Up+0.95V·cos ωt) from the power unit 7, where the voltages are generated by superposing RF voltages which are equal to the RF voltages ±V·cos ωt multiplied by a predetermined constant (in the present example, 0.95, although this is a mere example) on DC voltages ±Up whose voltage values are different from the DC voltage ±Um. On the other hand, the pre-rod electrodes 5011B-5014B of the second pre-rod section 501B located immediately before the first pre-rod section 501B are supplied with voltages equal to the RF voltages ±V·cos ωt multiplied by a predetermined constant (in the present example, 0.8) from the power unit 7, with no DC voltage ±Up superposed.

Additionally, the rod electrodes included in the main-rod section 500 are supplied with a predetermined DC bias voltage $V_{Bm}$, the rod electrodes included in the second pre-rod section 501B are supplied with a predetermined DC bias voltage $V_{B2}$, and the rod electrodes included in the first pre-rod section 501A are supplied with a predetermined DC bias voltage $V_{B1}$. As will be described later, the voltage value of the DC bias voltage $V_{B1}$ and that of the DC bias voltage $V_{B2}$ can be appropriately adjusted, while maintaining a predetermined relationship with each other, so as to make the ion intensity for an ion having a target m/z as high as possible.

[Setting of Voltages Applied to Pre-Rod Electrodes]

Figure 6:
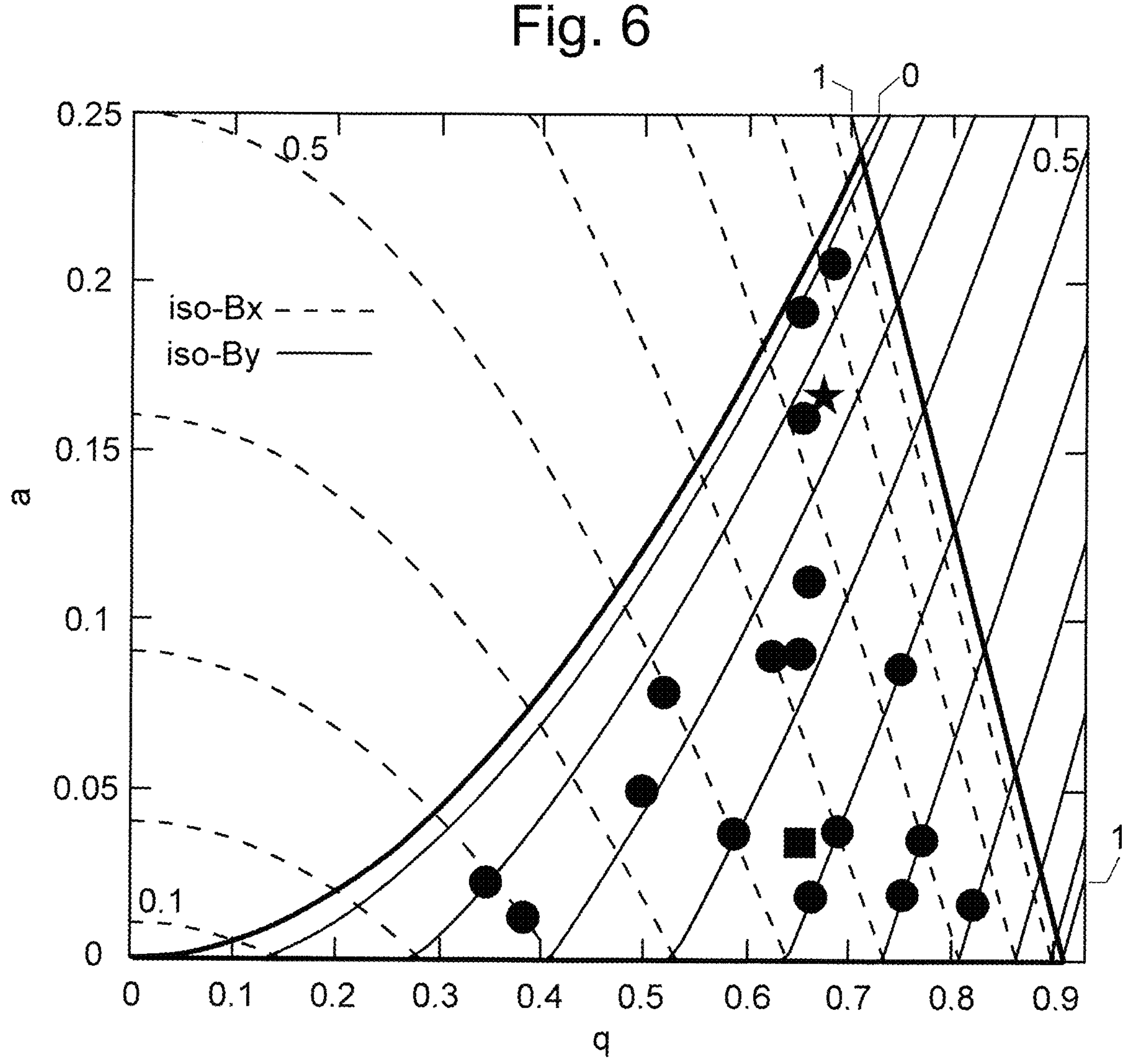
FIG. 6 is a diagram showing the positions of a and q which give satisfactory levels of ion transmittance on a Mathieu diagram.

In general, the condition for a stable oscillation of an ion within an electric field of a quadrupole mass filter is represented by a stability region in a Mathieu diagram with the horizontal axis indicating the q-value and the vertical axis indicating the a-value, as shown in FIG. 6. In FIG. 6, the roughly triangular area indicated by the thick line is the stability region. Each point (a, q) included in this stability region corresponds to a voltage condition under which the ion can exist in a stable manner.

Although this is commonly known, the a-value and the q-value in a quadrupole mass filter are defined as shown by the following equations (5):

$$a=(8eU)/(mr_0^2\omega^2),\ q=(4eVp)/(mr_0^2\omega^2) \quad (5)$$

Here, m is the mass of the ion, e is the charge of the ion, ω is the angular frequency of the RF voltage, U is the voltage value of the DC voltage, and V is the amplitude value of the RF voltage. From these equations, it can be understood that the a-value corresponds to the voltage value of the DC voltage, while the q-value corresponds to the amplitude value of the RF voltage.

In the conventional and common type of quadrupole mass spectrometer in which only the RF voltage is applied to the pre-rod electrodes, the voltage condition in the pre-rod section is located at a=0 within the stability region, i.e., on the bottom side of the roughly triangular stability region in FIG. 6. According to FIG. 3 in Non Patent Literature 1, the ion transmittance is extremely high when a=0. In other words, in the conventional device, the pre-rod section is driven under a voltage condition which should allow ions to efficiently pass through. Despite that, only a portion of the ions transported by the pre-rod section can actually enter the main-rod section.

Figure 5:
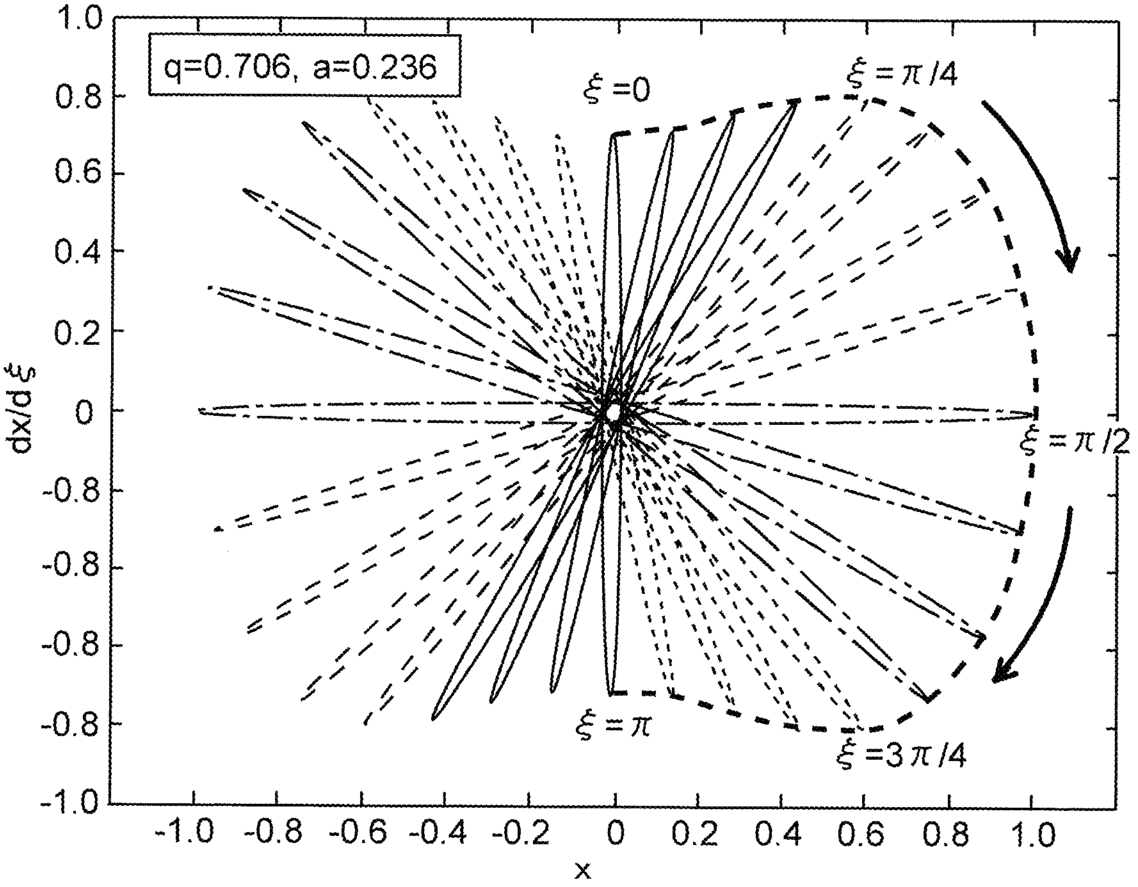
FIG. 5 is an acceptance diagram showing one example of the RF-voltage-period dependency of the position (x) and speed (dx/dξ) of an ion at an appropriate position within the electric field of a quadrupole mass filter.

In Non Patent Literature 1, as a technique for theoretically analyzing the oscillation of ions, an attempt has been made to express the motion of ions within a phase space during the process of the ions' passing through the electric field of the quadrupole mass filter by means of the expansion of the complex coefficient in the Bloch function. Although this will not be described here in detail, according to the method, an acceptance (or emittance) of ions within a quadrupole mass filter is drawn on a plane with the horizontal axis indicating the position x of each ion within the phase space and the vertical axis indicating the speed dx/dξ of the ion within the phase space (where ξ is a normalized time; ξ–(ω/2)·t), as illustrated in FIG. 5 (as well as FIGS. 11, 12 and 13). This diagram is hereinafter called the "acceptance diagram". It should be noted that the term "acceptance" in the present context is substantially synonymous with "emittance".

In the acceptance diagram, a phase space represented by one ellipse surrounding the central point (the point of x=0 and dx/dξ=0) corresponds to the orbit of an ion within one period of the RF voltage. The acceptance (or emittance) is a function of the normalized time ξ; with the progress of the normalized time ξ, the phase space represented by the ellipse rotates clockwise as shown by the arrows in FIG. 5. Meanwhile, the phase space represented by the ellipse also rotates clockwise every time the ion travels for one period of the RF voltage. Accordingly, the location at which the ion is present within the phase space changes from one period of the RF voltage to the next. Such a noticeable change in the acceptance depending on the phase of the RF voltage is one factor that makes it difficult to efficiently inject ions into the quadrupole mass filter.

In Non Patent Literature 1, a simulation analysis of an emittance conversion of ions by an auxiliary electric field created by a pre-rod section was performed. The result showed that the phase-space emittance of the ions within the auxiliary electric field was concentrated in a central area when the ions were present within the auxiliary electric field for a specific number of periods of the RF voltage. The simulation demonstrated that this concentration of the phase-space emittance of the ions occurs when the phase space of the ellipse in the acceptance diagram is oriented in a specific direction, or specifically, when an ellipse representing a complex amplitude corresponding to the phase-space acceptance is oriented in the vertical direction (the direction of the imaginary axis) on a basic complex amplitude diagram which shows the periodic complex amplitude of an ion with the horizontal axis indicating the real number and the vertical axis indicating the imaginary number.

If the phase-space emittance of the ions at the time of the transfer of the ions from the pre-rod section to the main-rod section is concentrated in the central area in the previously described manner, the ions can be accepted more efficiently. Accordingly, the present inventors conducted a study for determining the condition of the auxiliary electric field created by the pre-rod section, so as to regulate the complex rotation angle in each period of the RF voltage so that the ellipse representing the complex amplitude corresponding to the phase-space acceptance in the auxiliary electric field is oriented in the vertical direction (the direction of the imaginary axis) at a predetermined number of periods of the RF voltage.

According to the study by the present inventors, it is possible to control the complex rotation angle in each period of the RF voltage by adjusting the amplitude value Vp of the RF voltage without applying a DC voltage to the pre-rod electrodes, i.e., while maintaining the condition that the a-value which is a parameter of the Mathieu equation is zero. However, what is most essential for determining the transmittance of the ions is "how the emittance conversion occurs". For the matching between the emittance of the device located before the pre-rod section (e.g., a vacuum-partition lens or injection lens) and the acceptance of the pre-rod section, it is necessary to determine, based on the emittance, what values of (q, a) are the most suitable. Even with the same complex rotation angle, a change in (q, a) changes the way how the emittance conversion occurs, which causes a difference in the transmittance of the ions.

Figure 13B:
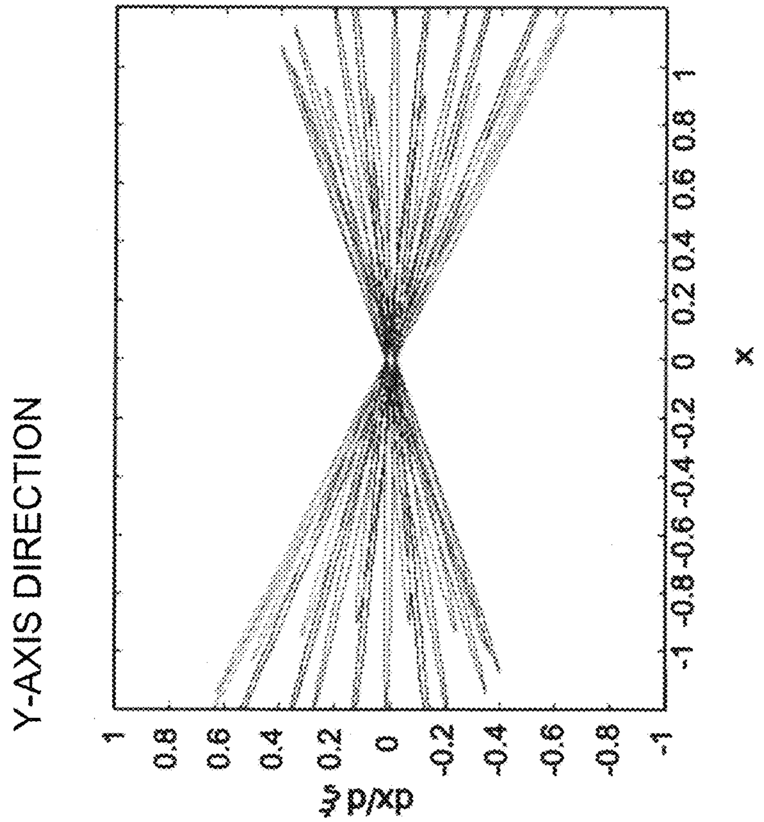
FIGS. 13A and 13B are acceptance diagrams showing the RF-voltage-period dependency of the position and speed of an ion in each of the X-axis and Y-axis directions at the entrance of the main-rod section in the case where the complex rotation angle in each period of the RF voltage was controlled, with the a-value fixed at zero.
Figure 13A:
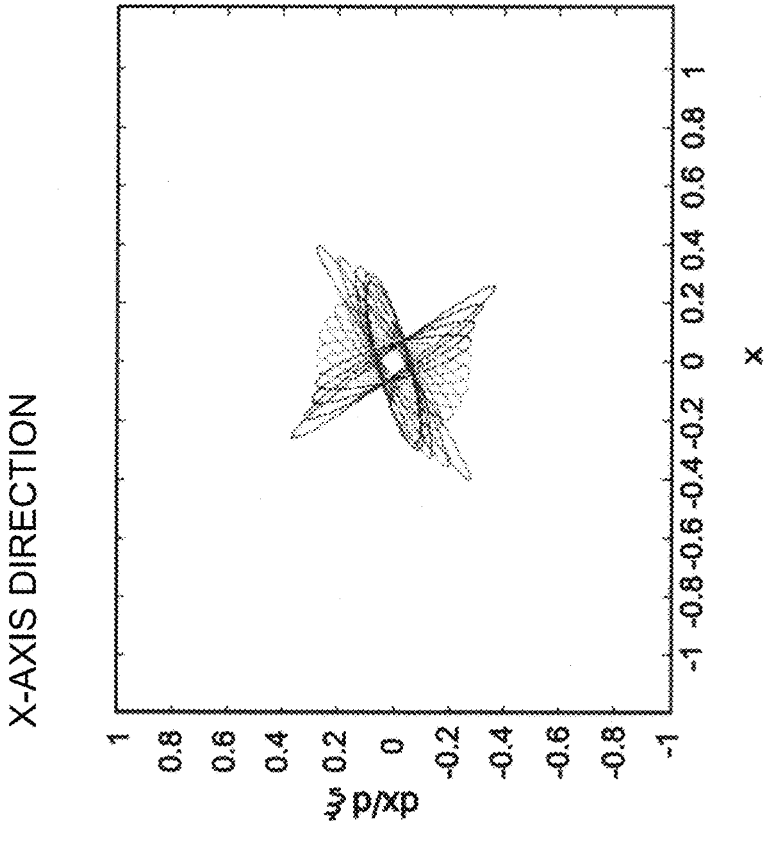

When the complex rotation angle in each period of the RF voltage is controlled with the a-value set at 0, the emittance conversion in the X-axis direction will not satisfactorily occur, as in the example shown in FIGS. 13A and 13B in which (q, a)=(0.560, 0). Taking this into account, the present inventors controlled the complex rotation angle in each period of the RF voltage by applying a DC voltage in addition to the RF voltage to the pre-rod electrodes and adjusting the voltage value of this DC voltage, i.e., by appropriately determining the q-value and the a-value (a≠0) in the pre-rod section, so as to cause the ellipse showing the complex amplitude to be oriented in the vertical direction (the direction of the imaginary axis) at a predetermined number of periods of the RF voltage. By introducing the condition of a≠0 (i.e., by superposing the U voltage), it is possible to effectively convert the emittance in both of the X-axis and Y-axis directions and thereby improve the transmittance of the ions as in the example shown in FIG. 11 (which will be described later) in which (q, a)=(0.672, 0.166).

Figure 12A:
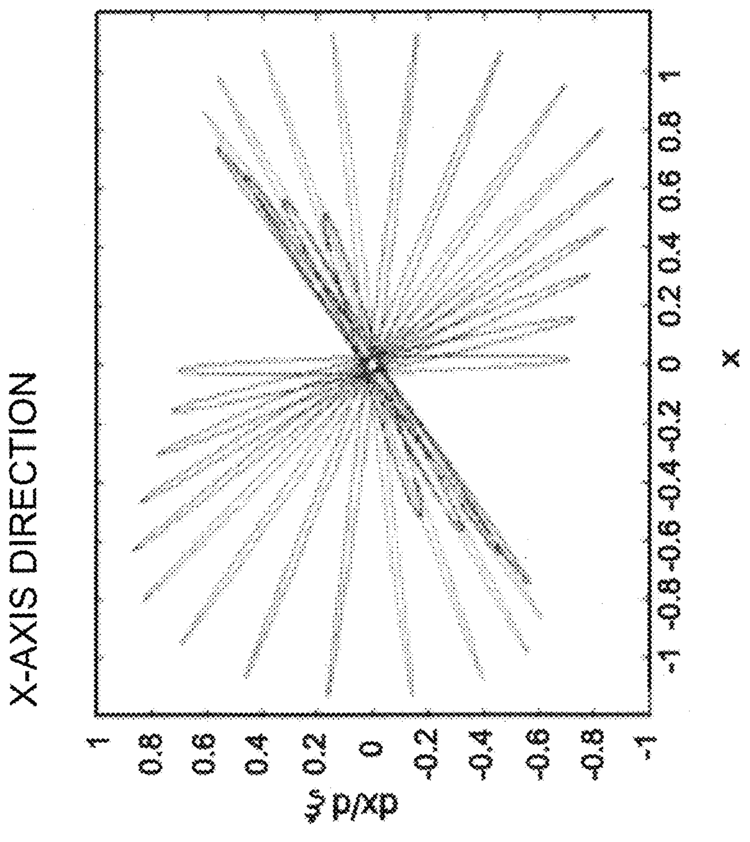
FIGS. 12A and 12B are acceptance diagrams showing the RF-voltage-period dependency of the position and speed of an ion in each of the X-axis and Y-axis directions at the entrance of the main-rod section in a conventional mass spectrometer.
Figure 12B:
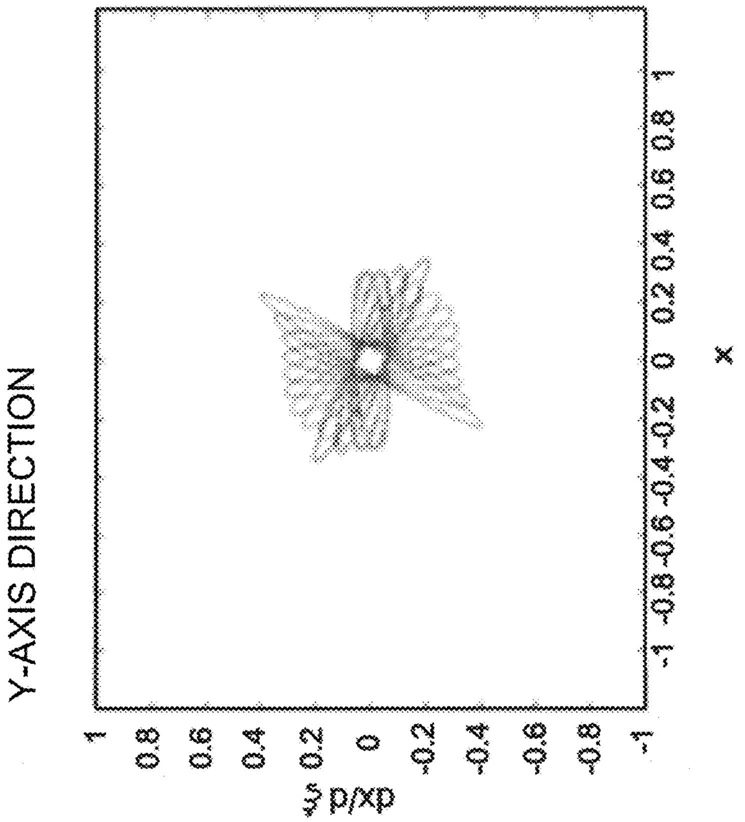

It should be noted here that the control needs to be performed in such a manner that the ions will be concentrated in the central area in both of the X-axis and Y-axis directions in the real space during the transfer of the ions from the pre-rod section to the main-rod section. It is difficult to perform such a control by the method in which, as described in Patent Literature 1, the number of oscillations of the ions passing through the pre-rod section is controlled by the voltage value of the DC bias voltage applied to the pre-rod electrodes. FIGS. 12A and 12B are acceptance diagrams showing the emittance of the ions in the X-axis and Y-axis directions, respectively, at the exit end of the pre-rod section by the method described in Patent Literature 1. In this example, the DC bias voltage is adjusted so that the emittance in the Y-axis is concentrated in the central area. As can be understood from those figures, in this case, the ions are concentrated in the central area in the Y-axis direction at any phase, whereas the ions are not concentrated in the central area in the X-axis direction. Therefore, a portion of the ions which have exited the pre-rod section cannot be accepted by the main-rod section, which becomes a significant cause of a decrease in the transmittance of the ion.

The condition for making the direction of the distribution axis of the complex amplitude (the direction of the ellipse) simultaneously coincide with the direction of the imaginary axis in both of the X-axis and Y-axis directions by adjusting the rotation angle θ of the RF period can be expressed by the following equations (6), where Ox is the rotation angle of the RF period in the X-axis direction, and Oy is the rotation angle of the RF period in the Y-axis direction. These rotation angles of the RF period correspond to the number of oscillations of the ions in the original motion of the ions and are known as the B-values in the Mathieu diagram. That is to say, θx and θy correspond to the numbers βx and βy of secular oscillations of the ions' oscillation in the X-axis and Y-axis directions, respectively, multiplied by π:

$$(\pi-\theta x)\cdot N=\{(1/2)+m\}\pi,\ \theta y\cdot N=\{(1/2)+n\}\pi \tag{6}$$

where m, n and N are all natural numbers, of which N is the length of time during which ions are present within the auxiliary electric field, represented by the number of periods of the RF voltage.

The aforementioned equations (6) can be rewritten into the following equations (7):

$$\theta x=\{1-[(1/2)+m]/N\}\pi,\ \theta y=[(1/2)+n]\cdot\pi/N \tag{7}$$

For the simplest case of m=n=1, the values of (θx, θy) calculated from equations (7) include ((4/5)π, (1/5)π), ((3/4)π, (1/4)π), ((2/3)π, (1/3)π) and ((1/2)π, (1/2)π).

Figure 11B:
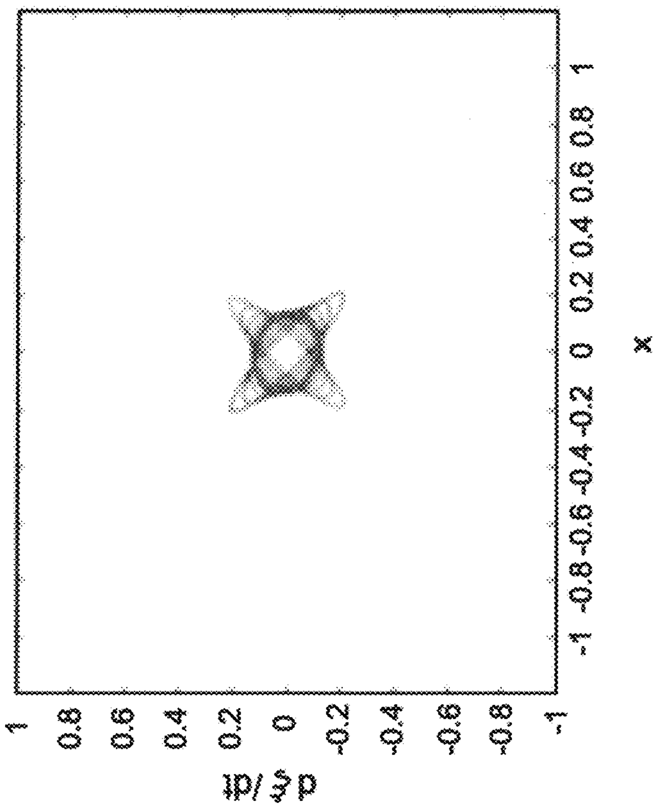
FIGS. 11A and 11B are acceptance diagrams showing the RF-voltage-period dependency of the position and speed of an ion in each of the X-axis and Y-axis directions at the entrance of the main-rod section in the mass spectrometer according to the present embodiment.
Figure 11A:
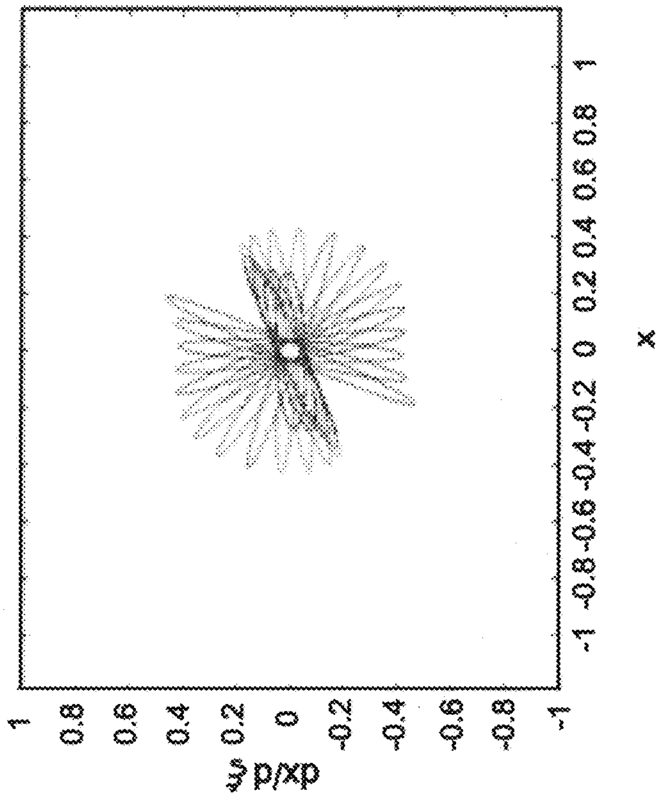

FIGS. 11A and 11B are acceptance diagrams at the entrance of the main-rod section 500 in the case of θx=(3/4)π and θy=(1/4)π. It can be understood that the ions are more concentrated in the central area in both of the X-axis and Y-axis directions than in the acceptance diagrams shown in FIGS. 12A and 12B.

It can be expected that the ion transmission efficiency will be improved by applying, to the pre-rod electrodes, voltages corresponding to a q-value and an a-value which satisfy the condition of the aforementioned equation (2) or (3).

Based on the previously described theory, whether or not the ion transmission efficiency will actually be improved and the ion intensity will be increased has been confirmed by a simulation and experiment for a wider range of cases, including m=n=1.

The filled dots, square and star on the Mathieu diagram shown in FIG. 6 represent the (q, a) conditions under which an increase in signal intensity as compared to a conventional device in which the voltage applied to the pre-rod section was set at (q, a)=(0.568, 0) was confirmed by the simulation. A verification using a real device was also performed for the (q, a) conditions represented by the square and the star, which also confirmed an increase in signal intensity as compared to the conventional device. The star corresponds to (m, n, N)=(1, 1, 6), and the square corresponds to (m, n, N)=(2, 2, 6).

Thus, both the simulation and the experiment confirmed that the ion transmittance can be improved by adjusting the voltage value of the DC voltage applied to the pre-rod electrodes so that the a-value and the q-value satisfy equations (6) or (7).

A more detailed description of the results of the simulation and experiment will be given later.

In principle, there is no restriction on the values of m, n and N. However, in practice, there are some restrictions due to various factors.

For example, N is the number of periods of the RF voltage and N=1 is theoretically possible. However, since the correction (conversion) of the emittance of the ions gradually occurs for each period of the RF voltage, it is practically difficult to satisfactorily correct a deviation of the direction of the distribution axis of the complex amplitude if the number of periods is small. On the other hand, too large a value of N makes it difficult to satisfactorily control the behavior of the ions against the variation of the angles at which the ions enter the pre-rod section. Taking these factors into account, a preferable range of N is from 3 to 20, and more preferably from 4 to 10. It was N=6 that was most preferable among the studied cases. The values of n and m should preferably be equal to or close to each other so as to establish a good balance between the X-axis and Y-axis directions. Additionally, those values should be as small as possible. Accordingly, for example, those values may preferably be (n, m)=(1, 1), (1, 2), (2, 1) or (2, 2).

[Adjustment of DC Bias Voltage in Pre-Rod Section with Two-Stage Configuration]

The pre-rod section 501 in the example shown in FIG. 2 has a single-stage configuration. When a DC voltage is applied to the pre-rod electrodes, the efficiency of the entry of the ions from the previous stage may possibly be lowered as compared to the case where no DC voltage is applied. To avoid this, the pre-rod section 501 can be configured to have a two-stage configuration as shown in FIG. 4. In the example shown in FIG. 4, a DC voltage (±Up) is applied along with the RF voltages (in the present example, ±0.95V·cos ωt) to the pre-rod electrodes 5011A-5014A constituting the first pre-rod section 501A located immediately before the main-rod section 500. Furthermore, RF voltages (in the present example, ±0.8V·cos ωt) with no DC voltage superposed are applied to the pre-rod electrodes 5011B-5014B constituting the second pre-rod section 501B located further before.

In the present case, efficient ion-transport conditions for both the section between the exit of the second pre-rod section 501B and the entrance of the first pre-rod section 501A, and the section between the exit of the first pre-rod section 501A and the entrance of the main-rod section 500, can be simultaneously achieved by setting the lengths of the pre-rod sections 501B and 501A as well as the RF voltage, DC voltage and DC bias voltage at their respective appropriate values.

The aforementioned equations (6) were theoretically derived based on the technical idea that the direction of the distribution axis of the complex amplitude should be made to coincide with the direction of the imaginary axis in both of the X-axis and Y-axis directions simultaneously so as to improve the transmittance of the ions and the ion-resolving power. However, since real devices have individual variations (mechanical errors) in terms of the lengths of the rod electrodes, positional relationship of the rod electrodes around the central axis and other aspects, the condition expressed by equations (6) cannot always be fully satisfied when the specified voltages based on the design values of the mass spectrometer are applied to the respective rod electrodes. The phrase "substantially satisfy" specific conditions in the present description means that it includes the case where, given the aforementioned variations, the voltage values are set at initial values based on the aforementioned theoretical equations and a parameter adjustment based on an actual performance, such as the maximization of the ion intensity, is additionally performed for each device as well as at an appropriate timing for the same device in order to cancel mechanical errors (and the likes) and achieve intended effects.

The device having the pre-rod section 501 with the two-stage configuration allows for an operation which includes, for example, initially setting the RF and DC voltages applied to the pre-rod sections 501B and 501A at their respective design values, and subsequently adjusting the DC bias voltages to perform the parameter adjustment. However, attempting an optimization by individually adjusting the DC bias voltages respectively applied to the second and first pre-rod sections 501B and 501A will require a considerable amount of time and labor for the adjustment, so that the adjustment will require a considerable period of time. To address this problem, an adjustment method which will be hereinafter described can be adopted to shorten the period of time required to optimize the DC bias voltages.

That is to say, according to the present adjustment method, the voltage value of the DC bias voltage applied to the second pre-rod section 501B and that of the DC bias voltage applied to the first pre-rod section 501A are simultaneously varied, with the ratio of the two voltages constantly maintained, so as to search for the voltages at which, for example, the ion intensity is maximized. Specifically, with $V_{B2}$ denoting the DC bias voltage applied to the second pre-rod section 501B and $V_{B1}$ denoting the DC bias voltage applied to the first pre-rod section 501A, the ratio of those voltage values, $V_{B2}/V_{B1}$, is fixed at a value determined by the following equation (8):

$$V_{B2}/V_{B1} = \{(L2\cdot N1)/(L1\cdot N2)\}^2 \tag{8}$$

where L2 and L1 are the lengths of the rod electrodes of the second and first pre-rod sections 501B and 501A, respectively, while N2 and N1 are the numbers of periods of the RF voltage during which ions reside within the second and first pre-rod sections 501B and 501A, respectively. With this setting, the condition expressed by equations (6) should be satisfied in both of the second and first pre-rod sections 501B and 501A. It should be noted that the second and first pre-rod sections 501B and 501A do not always need to have the same set of values of m, n and N (N1 or N2).

Equation (8) can be derived as follows: With v2 and v1 denoting the speeds of an ion in the second and first pre-rod sections 501B and 501A, T denoting the length of time corresponding to one period of the RF voltage, e denoting the elementary charge, and m denoting the mass of the ion, the following equations hold true:

$$L = (N\cdot T)\cdot v$$

$$v = \sqrt{(2\cdot e\cdot V_B/m)}$$

Accordingly, the following equation can be obtained:

$$V_{B2}/V_{B1} = (v2/v1)^2 = \{(L2/N2\cdot T)/(L1/N1\cdot T)\}^2 = \{(L2\cdot N1)/(L1\cdot N2)\}^2$$

For example, if L1=L2, N1=6, N2=3 and m1=n1=m2=n2=1, then $V_{B2}/V_{B1}$=4. In this case, θx1=0.75π, θy1=0.25π, and θx2=θy2=0.5π. Accordingly, in the present case, the task of the control unit 8 is to simultaneously vary the DC bias voltage $V_{B2}$ applied to the rod electrodes of the second pre-rod section 501B and the DC bias voltage $V_{B1}$ applied to the rod electrodes of the first pre-rod section 501A under the condition of $V_{B2}/V_{B1}$=4, to search for optimum values of the voltages which give the best or nearly best value of the ion intensity or signal-to-ratio, for example.

It should be noted that the optimum values of the DC bias voltages vary for each m/z. Therefore, the control unit 8 may be configured to determine the optimum values for each of a plurality of m/z beforehand and to change the DC bias voltages according to the m/z of the ion being analyzed in an actual mass spectrometric analysis.

In the present example, in order to facilitate the adjustment, the DC bias voltage is adjusted to correct a deviation from the condition under which equations (6) are theoretically satisfied, so as to achieve the best actual performance. Understandably, it is also possible to perform a similar adjustment by adjusting the amplitude value of the RF voltage or the voltage value of the DC voltage. That is to say, it is possible to correct a deviation from the condition under which equations (6) are satisfied, so as to achieve the best actual performance (the best value in the conditions under which equation (2) at the moment is satisfied), by adjusting one or more of the RF, DC and DC bias voltages applied to the rod electrodes included in the pre-rod section 501.

[Adoption of Injection Lens]

Figure 7:
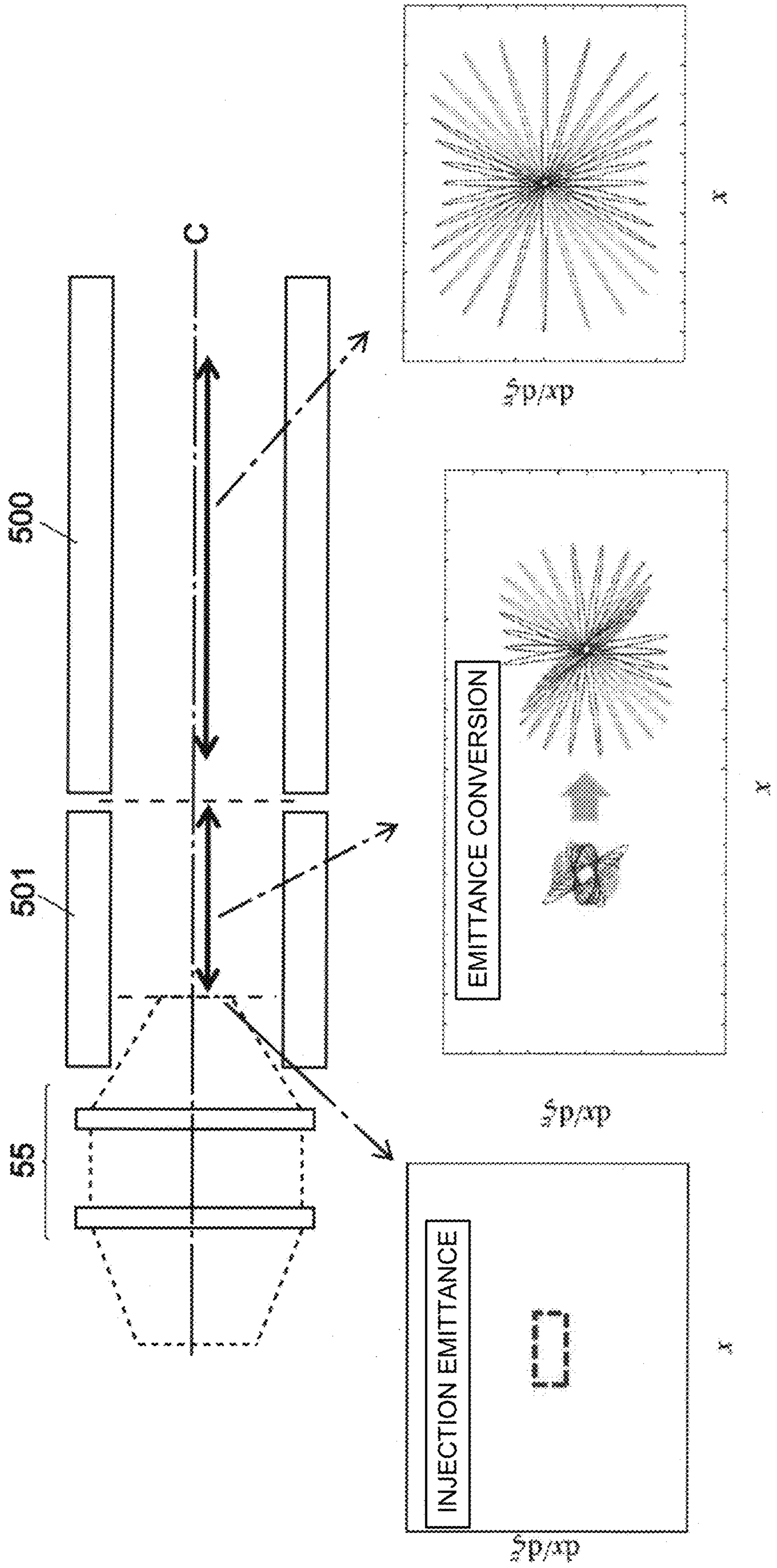
FIG. 7 is a diagram showing the emittance of the ions at each related section in the case where an ion injection lens is provided.

As in the example shown in FIG. 2, in the case of converting the emittance of the ions within the electric field in the pre-rod section 501 by applying a DC voltage to this section, an injection lens can be provided at the entrance of the pre-rod section 501 in order to improve the efficiency of the entry of the ions into the pre-rod section 501, the injection lens being capable of shaping the cross-sectional form of the ion stream to be fitted to the shape of the emittance of the ions at the entrance of the pre-rod section 501. FIG. 7 is a diagram showing a configuration provided with an injection lens 55 as well as an example of the emittance of the ions in each section in the present case. For example, the injection lens 55 can be formed by a plurality of annular electrodes arranged along the ion beam axis C.

[Simulation and Experiment for Verifying Effects]

A simulation and experiment carried out for verifying the effect of the mass spectrometer according to one mode of the present invention will be hereinafter described.

Figure 8A:
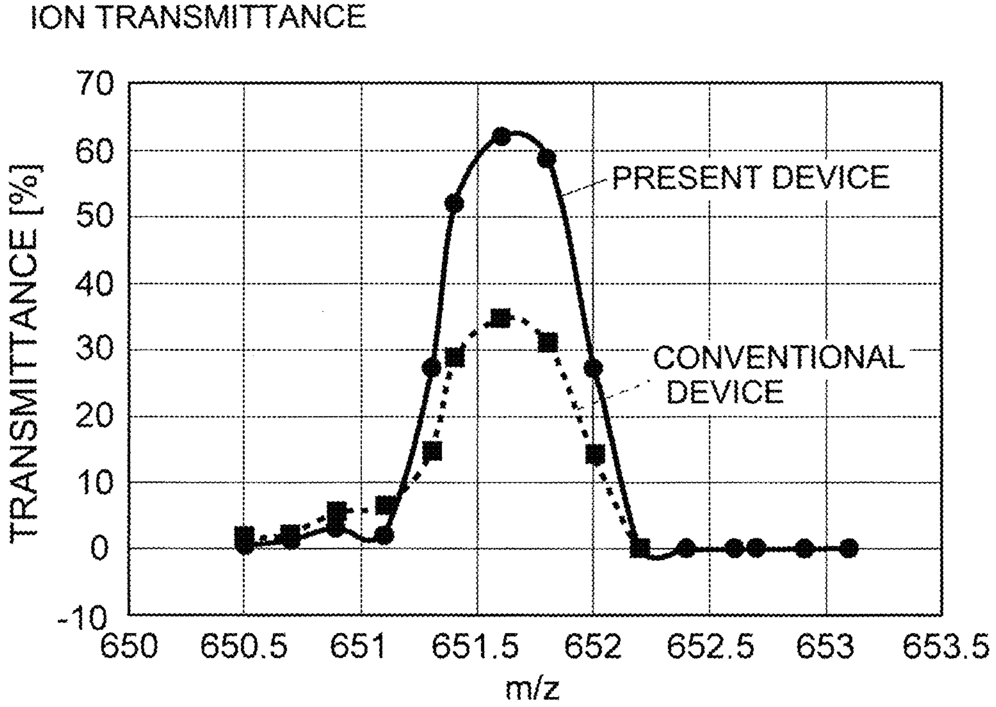
FIGS. 8A and 8B are diagrams showing evaluation results for ion transmittance (A) and peak shape (B) obtained by a simulation.
Figure 8B:
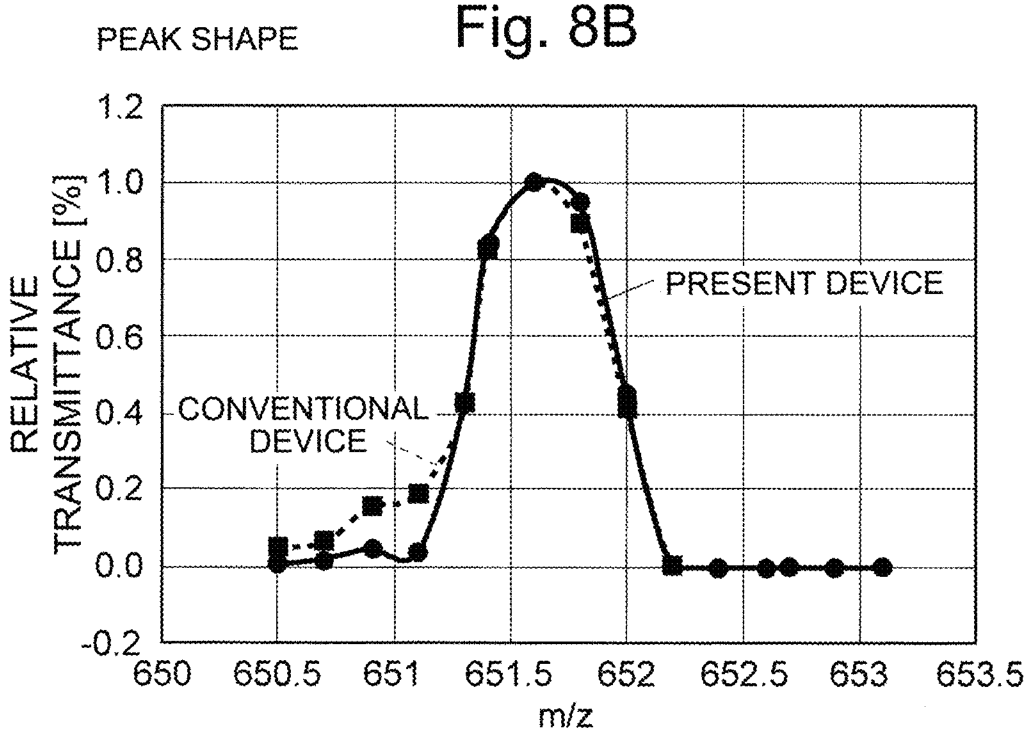

FIGS. 8A and 8B are graphs showing a comparison result by a simulation in which the mass spectrometer according to one mode of the present invention and a mass spectrometer employing a conventional quadrupole mass filter were compared in respect of the ion transmittance and the peak shape. For the simulation, a software product for an ion optical design, SIMION®, manufactured by Scientific Instrument Services, USA, was used. No DC voltage is applied to the pre-rod section in the conventional device. By comparison, in the present device, the pre-rod section 501 has a two-stage system as shown in FIG. 4, with RF voltages of $\pm(0.8 \cos \omega t)$ applied to the rod electrodes of the second pre-rod section 501B as well as RF voltages of $\pm(0.95 \cos \omega t)$ and DC voltages of $\pm 0.7$ U applied to the rod electrodes of the first pre-rod section 501A.

As shown in FIG. 8A, the present device is definitely superior to the conventional device in ion transmittance. A likely reason for the improvement in the ion transmittance is the appropriate conversion of the emittance at the pre-rod section 501, as explained earlier. As shown in FIG. 8B, the present device is also superior in terms of peak shape, although it is less obvious than in the case of the ion transmittance. A likely reason for the improvement in the peak shape is that the length of the main-rod section 500 is finite: In the conventional device, ions which would not be allowed to pass through under the theoretical premise that the main-rod section is infinitely long are actually allowed to pass through since the length of the main-rod section is finite, causing the peak on the mass spectrum to be broadened. By comparison, in the present device, it can be presumed the improved matching between the emittance of the pre-rod section 501 and the acceptance of the main-rod section 500 enhanced the performance as a mass filter, so that the phenomenon which would occur in the conventional device was moderated.

Figure 9:
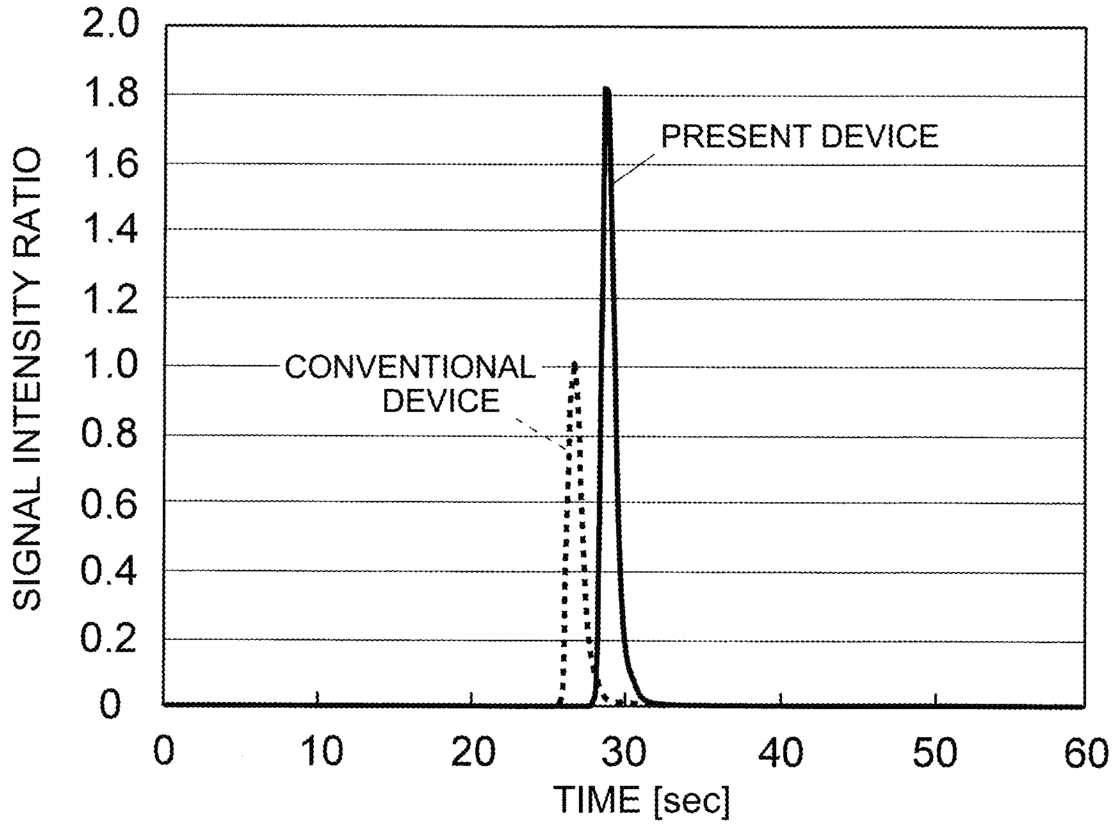
FIG. 9 is a diagram showing the result of a sensitivity comparison by an experiment.

FIG. 9 is a graph comparing experimental results obtained by an analysis performed on reserpine for each of the present and conventional devices, using a flow injection analysis method for introducing the sample. The vertical axis in FIG. 9 indicates a normalized signal intensity, with the maximum value of the signal intensity obtained with the conventional defined as 1, while the horizontal axis indicates time. According to FIG. 9, the present device excels the conventional device at signal intensity. Thus, the experimental results also confirmed that the improvement in ion transmittance enhances the detection sensitivity.

Figure 10:
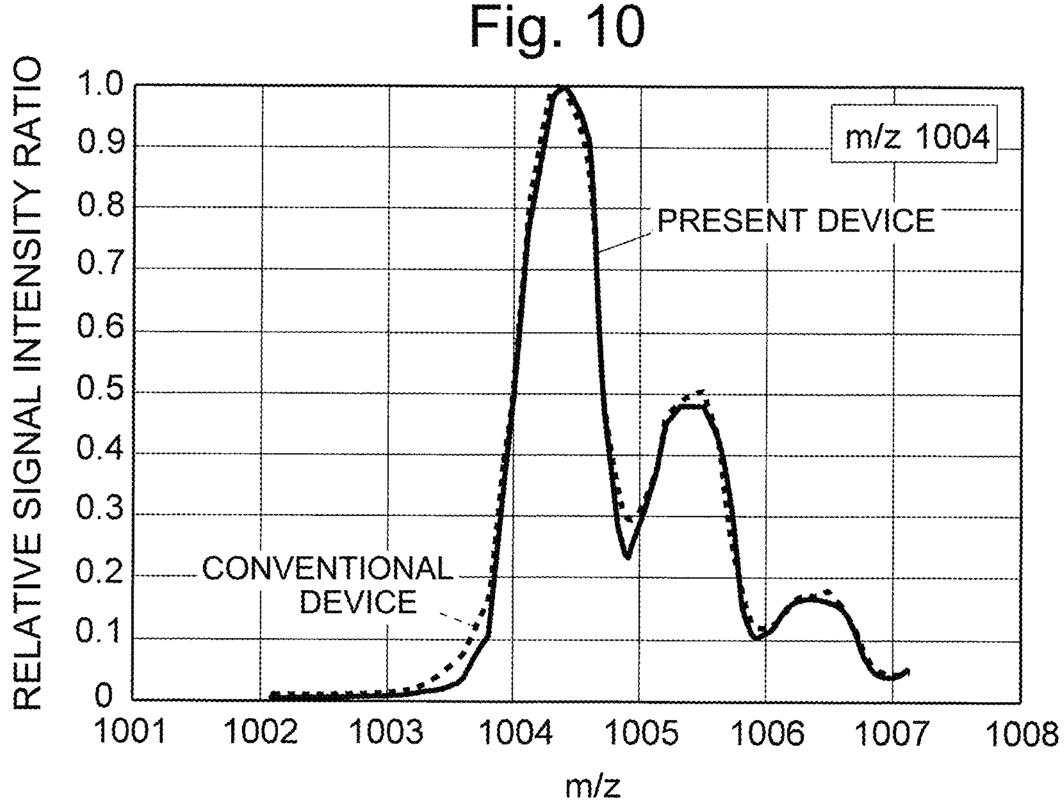
FIG. 10 is a diagram showing the result of a peak-shape comparison by an experiment.

FIG. 10 is a graph comparing peak shapes obtained by an analysis performed on polyethylene glycol (PEG) for each of the present and conventional devices, using a flow injection analysis method for introducing the sample. The vertical axis in FIG. 10 indicates the relative signal intensity normalized with respect to the maximum signal intensity in each case. The experimental results also confirmed that the present device can produce a sharper peak than the conventional device.

It should be noted that the previously described embodiment and its variation are mere examples. It is evident that any change, addition or modification appropriately made within the spirit of the present invention will be included within the scope of claims of the present application.

For example, although the previously described embodiment and its variation are all concerned with a triple quadrupole mass spectrometer employing a quadrupole mass filter provided with a pre-rod section, it is evident that the present invention is also applicable in a single-type of quadrupole mass spectrometer or quadrupole time-of-flight mass spectrometer. It should also be naturally understood that the components other than the quadrupole mass filter, such as an ion source, are not limited to the previously described ones and may be appropriately changed or modified.

[Various Modes]

A person skilled in the art can understand that the previously described illustrative embodiment is a specific example of the following modes of the present invention.

(Clause 1) One mode of the quadrupole-mass-filter driving method according to the present invention is a quadrupole-mass-filter driving method for operating a quadrupole mass filter which includes a main-rod section including four rod electrodes arranged so as to surround a central axis and a first pre-rod section including four rod electrodes arranged at a position on the upstream side of an ion stream from the main-rod section in the extending direction of the central axis, the method including:

a voltage calculation step for determining a DC voltage Up and the amplitude Vp of an RF voltage with which an a-value and a q-value which are parameters of a Mathieu equation expressing a motion of an ion and have relationships with βx and βy as expressed by the aforementioned equations (1) and (2) substantially satisfy the conditions that $a \neq 0$, $(\pi - \beta x \cdot \pi)N = \{(1/2)+m\}\pi$ and $\beta y \cdot \pi \cdot N = \{(1/2)+n\}\pi$, where m, n and N are natural numbers, the X-axis direction is defined as a direction connecting the centers of one pair of rod electrodes facing each other across the central axis in a plane perpendicular to the central axis, the Y-axis direction is defined as a direction connecting the centers of the other pair of rod electrodes in the plane, and βx and βy represent β values (0<β<1) related to a secular oscillation of an ion in the X and Y directions, respectively, with the relationship of Up and Vp with a and q defined by the aforementioned equations (3) and (4); and a voltage application step for applying, to each rod electrode of the main-rod section, a voltage in which a DC voltage according to the m/z of a target ion is superposed on an RF voltage according to the same m/z, as well as applying, to each rod electrode of the first pre-rod electrodes, a voltage in which an RF voltage ±Vp·cos ωt having an amplitude Vp and a frequency equal to the frequency of the RF voltage applied to the main-rod section is superposed on a DC voltage ±Up having a voltage value different from the DC voltage applied to the main-rod section, when an analysis is performed.

(Clause 9) One mode of the quadrupole mass spectrometer according to the present invention includes:

a quadrupole mass filter which includes a main-rod section including four rod electrodes arranged so as to surround a central axis and a first pre-rod section including four rod electrodes arranged so as to surround the central axis at a position on the upstream side of an ion stream from the main-rod section along the central axis;

a main voltage application section configured to apply, to each rod electrode of the main-rod section, a voltage in which a DC voltage according to the m/z of an ion is superposed on an RF voltage according to the same m/z, so as to create a quadrupole electric field in the main-rod section; and an auxiliary voltage application section configured to apply, to each rod electrode of the first pre-rod section, a voltage in which an RF voltage ±Vp·cos ωt having the same frequency as the aforementioned RF voltage is superposed on a DC voltage ±Up having a voltage value different from the DC voltage applied to the main-rod section, so as to create a quadrupole electric field in the first pre-rod section, where the DC voltage value Up and the amplitude value Vp of the RF voltage applied by the auxiliary voltage application section are determined so that the values of a and q which are parameters of a Mathieu equation expressing a motion of an ion and have relationships with Up and Vp as expressed by the aforementioned equations (3) and (4) as well as relationships with βx and βy as expressed by the aforementioned equations (1) and (2), substantially satisfy the conditions that a≠0, $(\pi-\beta x\cdot\pi)N=\{(1/2)+m\}\pi$ and $\beta y\cdot\pi\cdot N=\{(1/2)+n\}\pi$, where m, n and N are natural numbers, the X-axis direction is defined as a direction connecting the centers of one pair of rod electrodes facing each other across the central axis in a plane perpendicular to the central axis, the Y-axis direction is defined as a direction connecting the centers of the other pair of rod electrodes in the plane, and βx and βy represent β values (0<β<1) related to a secular oscillation of an ion in the X and Y directions, respectively.

In the quadrupole-mass-filter driving method according to Clause 1 and the quadrupole mass spectrometer according to Clause 9, when ions pass through the pre-rod section, the cross-sectional form of the emittance of the ions is appropriately converted in both of the X-axis and Y-axis directions due to the effect of the electric field created in the pre-rod section, so that the ions are concentrated in the central area of the phase space when they are transferred to the main-rod section. Therefore, the loss of ions which occurs when the ions that have passed through the pre-rod section enter the main-rod section can be decreased as compared to the conventional case, and the general ion transmission efficiency in the quadrupole mass filter can be improved. Accordingly, the quadrupole-mass-filter driving method according to Clause 1 and the quadrupole mass spectrometer according to Clause 9 can increase the amount of ions to be sent from the quadrupole mass filter to the subsequent device, such as an ion detector or collision cell, and thereby enhance the analysis sensitivity.

(Clauses 2 and 10) In the quadrupole-mass-filter driving method according to Clause 1 and the quadrupole mass spectrometer according to Clause 9, N may be between 3 and 20, inclusive.

(Clauses 3 and 11) In the quadrupole-mass-filter driving method according to Clause 2 and the quadrupole mass spectrometer according to Clause 10, N may be between 4 and 10, inclusive.

(Clauses 4 and 12) In the quadrupole-mass-filter driving method according to Clause 3 and the quadrupole mass spectrometer according to Clause 11, N may be 6.

N represents the period of time during which the ions are present within the pre-rod section in terms of the number of periods of the RF voltage. There is theoretically no restriction on its value. However, too small a value of N makes it difficult to perform a satisfactory emittance conversion for concentrating the emittance of the ions into the central area. Conversely, too large a value of N makes it difficult to satisfactorily control the behavior of the ions against the variation of the angles at which the ions enter the pre-rod section. Accordingly, there is a practical restriction on the range of the possible values of N. A preferable range of N is between 3 and 20, and more preferably between 4 and 10, and the most preferable value is 6.

(Clauses 5 and 13) In the quadrupole-mass-filter driving method according to Clause 1 and the quadrupole mass spectrometer according to Clause 9, each of n and m may be 1 or 2.

(Clauses 6 and 14) In the quadrupole-mass-filter driving method according to Clause 5 and the quadrupole mass spectrometer according to Clause 13, n and m may be equal to each other.

In other words, the combinations of n and m may be one of the following: n=m=1, n=1 and m=2, n=2 and m=1, as well as n=m=2.

There is also no restriction on the values of n and m, although it is practically preferable that n and m should be small values, and if possible, be equal to each other.

(Clauses 7 and 15) In the quadrupole-mass-filter driving method according to Clause 1 and the quadrupole mass spectrometer according to Clause 9, βx and βy may have a relationship of βx+βy=1.

(Clause 8) In the quadrupole-mass-filter driving method according to Clause 7, the voltage calculation step may include determining Up and Vp so that the a-value and the q-value substantially satisfy βx=¾ and βy=¼.

(Clause 16) Similarly, in the quadrupole mass spectrometer according to Clause 15, the voltages in the auxiliary voltage application section are set so that the a-value and the q-value substantially satisfy βx=¾ and βy=¼.

The quadrupole-mass-filter driving methods according to Clauses 7 and 8 as well as the quadrupole mass spectrometers according to Clauses 15 and 16 can significantly improve the ion transmission efficiency as compared to a conventional device and thereby sufficiently enhance the detection sensitivity.

(Clause 17) In the quadrupole mass spectrometer according to Clause 9, the quadrupole mass filer may include a second pre-rod section including four rod electrodes located further before the first pre-rod section; and the auxiliary voltage application section may further be configured to apply an RF voltage having the same frequency as the aforementioned RF voltage, with no DC voltage for creating a quadrupole electric field superposed, to each rod electrode of the second pre-rod section.

(Clause 18) In the quadrupole mass spectrometer according to Clause 17, the RF voltage applied to each rod electrode of the second pre-rod section may be set so that the q-value satisfies βx=½ and βy=½, where $r_0$ included in the equation defining this q-value represents the distance from the central axis to each rod electrode of the second pre-rod section.

In the quadrupole mass spectrometers according to Clauses 17 and 18, ions can be efficiently sent to the main-rod section while the efficiency of the entry of the ions coming from the previous stage into the pre-rod section is maintained at a level comparable to the efficiency achieved by the conventional device. Therefore, the ion transmission efficiency can be even further improved.

(Clause 19) In the quadrupole mass spectrometer according to Clause 17, the auxiliary voltage application section may further be configured to apply DC bias voltages having voltage values different from one another to the first pre-rod section and the second pre-rod section.

(Clause 20) In the quadrupole mass spectrometer according to Clause 19, the relationship between the DC bias voltage $V_{B1}$ applied to each rod electrode of the first pre-rod section and the DC bias voltage $V_{B2}$ applied to each rod electrode of the second pre-rod section may be set so that $V_{B2}/V_{B1}=\{(L2\times N1)/(L1\times N2)\}^2$, where L1 is the length of the rod electrodes of the first pre-rod section, L2 is the length of the rod electrodes of the second pre-rod section, N1 is the number of periods of the RF voltage corresponding to the length of time during which ions pass through the first pre-rod section, and N2 is the number of periods of the RF voltage corresponding to the length of time during which ions pass through the second pre-rod section.

(Clause 21) The quadrupole mass spectrometer according to Clause 20 may further include a parameter adjustment section configured to perform an adjustment for optimizing parameters by changing each of the DC bias voltages $V_{B1}$ and $V_{B2}$ while maintaining the relationship of $V_{B2}/V_{B1}=\{(L2\times N1)/(L1\times N2)\}^2$ between the DC bias voltages $V_{B1}$ and $V_{B2}$.

In the quadrupole mass spectrometers according to Clauses 19 through 21, the adjustment for optimizing parameters in the multiple pre-rod sections can be performed more easily and requires a shorter period of time than in the case where the adjustment is individually performed for each pre-rod section.

(Clause 22) The quadrupole mass spectrometer according to Clause 9 may further include an ion injection lens configured to reduce the spread of ions around the central axis in front of the pre-rod section located closest to the front end in the quadrupole mass filter.

The quadrupole mass spectrometer according to Clause 22 can improve the efficiency of the entry of the ions into the pre-rod section and even further enhance the ion transmission efficiency.

(Clause 23) The quadrupole mass spectrometer according to Clause 9 may further include a control section configured to perform an adjustment in which at least one voltage applied from the auxiliary voltage application section to each rod electrode of the first pre-rod section is adjusted in the vicinity of a preset value, based on an ion intensity signal obtained with a detector, where the at least one voltage is either the RF voltage or DC voltage for creating a quadrupole electric field or a DC bias voltage.

The quadrupole mass spectrometer according to Clause 23 can appropriately adjust parameters so as to make the device closer to the ideal condition and assuredly improve the detection sensitivity even when a certain change, such as a variation in the length of the rod electrodes or a change in the device condition, has occurred since the point in time where the voltage values and other parameters were previously determined.

Furthermore, one mode of the method for adjusting a quadrupole mass spectrometer related to the present invention is a method for adjusting a quadrupole mass spectrometer including: a quadrupole mass filter which includes a main-rod section including four rod electrodes arrange so as to surround a central axis and a first pre-rod section including four rod electrodes arranged in front of the main-rod section along the central axis; and a voltage application section configured to apply voltages to each rod electrode of the main-rod section and each rod electrode of the pre-rod section, respectively, where:

at least one voltage which is either an RF voltage or DC voltage for creating a quadrupole electric field or a DC bias voltage, applied from the voltage application section to each rod electrode of the pre-rod section, is adjusted based on a result of a detection of ions, within a range in which an a-value and a q-value which are parameters of a Mathieu equation expressing a motion of an ion satisfy the condition of a stability region on a Mathieu diagram, and in which a≠0.

By this method for adjusting a quadrupole mass spectrometer, the loss of ions which occurs when the ions that have passed through the pre-rod section enter the main-rod section can be decreased as compared to the conventional case, so that the general ion transmission efficiency in the quadrupole mass filter can be improved. This increases the amount of ions to be sent from the quadrupole mass filter to the subsequent device, such as an ion detector or collision cell, and thereby enhances the analysis sensitivity.

In the previously described method for adjusting a quadrupole mass spectrometer, the RF voltage and DC voltage for creating a quadrupole electric field among the voltages applied to each rod electrode of the pre-rod section may have design values, and the DC bias voltage may be adjusted based on a result of a detection of ions under the design values.

Furthermore, in the previously described method for adjusting a quadrupole mass spectrometer, the DC voltage value Up and the amplitude value Vp of the RF voltage applied to the rod electrodes of the pre-rod section may be determined so that the values of a and q which are parameters of a Mathieu equation expressing a motion of an ion and have relationships with Up and Vp as expressed by the aforementioned equations (3) and (4) as well as relationships with βx and βy as expressed by the aforementioned equations (1) and (2), substantially satisfy the conditions that a≠0, (π−βx·π)N={(½)+m}π and βy·π·N={(½)+n}π, where m, n and N are natural numbers, the X-axis direction is defined as a direction connecting the centers of one pair of rod electrodes facing each other across the central axis in a plane perpendicular to the central axis, the Y-axis direction is defined as a direction connecting the centers of the other pair of rod electrodes in the plane, and βx and βy represent β values (0<<1) related to a secular oscillation of an ion in the X and Y directions, respectively.

By these methods for adjusting a quadrupole mass spectrometer, the parameters can be appropriately adjusted to be closer to the values assumed in the design phase, and the detection sensitivity can be assuredly improved, even when a certain change has occurred, such as a variation in the length of the rod electrodes or a change in the device condition.

REFERENCE SIGNS LIST

1 . . . . Vacuum Chamber
2 . . . . First Intermediate Vacuum Chamber
20 . . . . Ion Guide
21 . . . . Skimmer
3 . . . . Second Intermediate Vacuum Chamber
30 . . . . Ion Guide
4 . . . . Third Intermediate Vacuum Chamber
40 . . . . Ion Guide
5 . . . . Analysis Chamber
50 . . . . Front Quadrupole Mass Filter
500 . . . . Main-Rod Section
5001, 5002, 5003, 5004 . . . . Rod Electrode
501 . . . . Pre-Rod Section
5011, 5012, 5013, 5014 . . . . Pre-Rod Electrode
502 . . . . Post-Rod Section
51 . . . . Collision Cell
52 . . . Ion Guide
53 . . . Rear Quadrupole Mass Filter
530 . . . . Main-Rod Section
531 . . . Pre-Rod Section
54 . . . . Ion Detector
6 . . . Ionization Unit
60 . . . Ionization Chamber
61 . . . . ESI Probe
62 . . . . Desolvation Tube
7 . . . . Power Unit
8 . . . Control Unit

The invention claimed is:

1. A quadrupole-mass-filter driving method for operating a quadrupole mass filter which includes a main-rod section including four rod electrodes arranged so as to surround a central axis and a first pre-rod section including four rod electrodes arranged at a position on an upstream side of an ion stream from the main-rod section in an extending direction of the central axis, the method comprising:

a voltage calculation step for determining a DC voltage Up and an amplitude Vp of an RF voltage with which an a-value and a q-value which are parameters of a Mathieu equation expressing a motion of an ion and have relationships with βx and βy as expressed by equations (1) and (2) substantially satisfy conditions that a≠0, (π−βx·π)N={(½)+m}π and βy·π·N={(½)+n}π, where m, n and N are natural numbers, an X-axis direction is defined as a direction connecting centers of one pair of rod electrodes facing each other across the central axis in a plane perpendicular to the central axis, an Y-axis direction is defined as a direction connecting centers of another pair of rod electrodes in the plane, and βx and βy represent β values (0<β<1) related to a secular oscillation of an ion in the X and Y directions, respectively, with a relationship of Up and Vp with a and q defined by equations (3) and (4); and a voltage application step for applying, to each rod electrode of the main-rod section, a voltage in which a DC voltage according to an m/z of a target ion is superposed on an RF voltage according to the same m/z, as well as applying, to each rod electrode of the first pre-rod electrodes, a voltage in which an RF voltage ±Vp·cos ωt having an amplitude Vp and a frequency equal to a frequency of the RF voltage applied to the main-rod section is superposed on a DC voltage ±Up having a voltage value different from the DC voltage applied to the main-rod section, when an analysis is performed:

$$\beta_x^2 = a + \cfrac{q_x^2}{(\beta_x+2)^2 - a - \cfrac{q_x^2}{(\beta_x+4)^2 - a - \cfrac{q_x^2}{(\beta_x+6)^2 - a - \ldots}}} + \cfrac{q_x^2}{(\beta_x-2)^2 - a - \cfrac{q_x^2}{(\beta_x-4)^2 - a - \cfrac{q_x^2}{(\beta_x-6)^2 - a - \ldots}}} \quad (1)$$

$$\beta_y^2 = -a + \cfrac{q_y^2}{(\beta_y+2)^2 + a - \cfrac{q_y^2}{(\beta_y+4)^2 + a - \cfrac{q_y^2}{(\beta_y+6)^2 + a - \ldots}}} + \cfrac{q_y^2}{(\beta_y-2)^2 + a - \cfrac{q_y^2}{(\beta_y-4)^2 + a - \cfrac{q_y^2}{(\beta_y-6)^2 + a - \ldots}}} \quad (2)$$

$$a = \frac{8eUp}{mr_0^2\omega^2} \quad (3)$$

$$q = \frac{4eVp}{mr_0^2\omega^2} \quad (4)$$

where e is a charge of the ion, m is a mass of the ion, $r_0$ is a distance from the central axis to each rod electrode of the first pre-rod electrode, and ω is an angular frequency of the RF voltage.

2. The quadrupole-mass-filter driving method according to claim 1, wherein N is between 3 and 20, inclusive.

3. The quadrupole-mass-filter driving method according to claim 2, wherein N is between 4 and 10, inclusive.

4. The quadrupole-mass-filter driving method according to claim 3, wherein N is 6.

5. The quadrupole-mass-filter driving method according to claim 1, wherein each of n and m is 1 or 2.

6. The quadrupole-mass-filter driving method according to claim 5, wherein n and m are equal to each other.

7. The quadrupole-mass-filter driving method according to claim 1, wherein βx and βy have a relationship of βx+βy=1.

8. The quadrupole-mass-filter driving method according to claim 7, wherein the voltage calculation step includes determining Up and Vp so that the a-value and the q-value substantially satisfy βx=¾ and βy=¼.

9. A quadrupole mass spectrometer comprising:

a quadrupole mass filter which includes a main-rod section including four rod electrodes arranged so as to surround a central axis and a first pre-rod section including four rod electrodes arranged so as to surround the central axis at a position on an upstream side of an ion stream from the main-rod section along the central axis;

a main voltage application section configured to apply, to each rod electrode of the main-rod section, a voltage in which a DC voltage according to an m/z of an ion is superposed on an RF voltage according to the same m/z, so as to create a quadrupole electric field in the main-rod section; and an auxiliary voltage application section configured to apply, to each rod electrode of the first pre-rod section, a voltage in which an RF voltage ±Vp·cos ωt having the same frequency as the aforementioned RF voltage is superposed on a DC voltage ±Up having a voltage value different from the DC voltage applied to the main-rod section, so as to create a quadrupole electric field in the first pre-rod section, where the DC voltage value Up and the amplitude value Vp of the RF voltage applied by the auxiliary voltage application section are determined so that values of a and q which are parameters of a Mathieu equation expressing a motion of an ion and have relationships with Up and Vp as expressed by equations (3) and (4) as well as relationships with βx and βy as expressed by equations (1) and (2), substantially satisfy conditions that a≠0, (π−βx·π)N={(½)+m}π and βy·π·N={(½)+n}π, where m, n and N are natural numbers, an X-axis direction is defined as a direction connecting centers of one pair of rod electrodes facing each other across the central axis in a plane perpendicular to the central axis, a Y-axis direction is defined as a direction connecting centers of another pair of rod electrodes in the plane, and βx and βy represent β values (0<β<1) related to a secular oscillation of an ion in the X and Y directions, respectively:

$$\beta_x^2 = a + \cfrac{q_x^2}{(\beta_x+2)^2 - a - \cfrac{q_x^2}{(\beta_x+4)^2 - a - \cfrac{q_x^2}{(\beta_x+6)^2 - a - \dots}}} + \cfrac{q_x^2}{(\beta_x-2)^2 - a - \cfrac{q_x^2}{(\beta_x-4)^2 - a - \cfrac{q_x^2}{(\beta_x-6)^2 - a - \dots}}} \quad (1)$$

$$\beta_y^2 = -a + \cfrac{q_y^2}{(\beta_y+2)^2 + a - \cfrac{q_y^2}{(\beta_y+4)^2 + a - \cfrac{q_y^2}{(\beta_y+6)^2 + a - \dots}}} + \cfrac{q_y^2}{(\beta_y-2)^2 + a - \cfrac{q_y^2}{(\beta_y-4)^2 + a - \cfrac{q_y^2}{(\beta_y-6)^2 + a - \dots}}} \quad (2)$$

$$a = \frac{8eUp}{mr_0^2\omega^2} \quad (3)$$

-continued $$q = \frac{4eVp}{mr_0^2\omega^2} \quad (4)$$

where e is a charge of the ion, m is a mass of the ion, $r_0$ is a distance from the central axis to each rod electrode of the first pre-rod electrode, and ω is an angular frequency of the RF voltage.

10. The quadrupole mass spectrometer according to claim 9, wherein N is between 3 and 20, inclusive.

11. The quadrupole mass spectrometer according to claim 10, wherein N is between 4 and 10, inclusive.

12. The quadrupole mass spectrometer according to claim 11, wherein N is 6.

13. The quadrupole mass spectrometer according to claim 9, wherein each of n and m is 1 or 2.

14. The quadrupole mass spectrometer according to claim 13, wherein n and m are equal to each other.

15. The quadrupole mass spectrometer according to claim 9, wherein βx and βy have a relationship of βx+βy=1.

16. The quadrupole mass spectrometer according to claim 15, wherein the voltages in the auxiliary voltage application section are set so that the a-value and the q-value substantially satisfy βx=¾ and βy=¼.

17. The quadrupole mass spectrometer according to claim 9, wherein:

the quadrupole mass filer includes a second pre-rod section including four rod electrodes located further before the first pre-rod section; and the auxiliary voltage application section is further configured to apply an RF voltage having the same frequency as the aforementioned RF voltage, with no DC voltage for creating a quadrupole electric field superposed, to each rod electrode of the second pre-rod section.

18. The quadrupole mass spectrometer according to claim 17, wherein the RF voltage applied to each rod electrode of the second pre-rod section is set so that the q-value satisfies βx=½ and βy=½, where $r_0$ included in the equation defining this q-value represents a distance from the central axis to each rod electrode of the second pre-rod section.

19. The quadrupole mass spectrometer according to claim 17, wherein the auxiliary voltage application section is further configured to apply DC bias voltages having voltage values different from one another to the first pre-rod section and the second pre-rod section.

20. The quadrupole mass spectrometer according to claim 19, wherein a relationship between the DC bias voltage $V_{B1}$ applied to each rod electrode of the first pre-rod section and the DC bias voltage $V_{B2}$ applied to each rod electrode of the second pre-rod section are set so that $V_{B2}/V_{B1}=\{(L2\times N1)/(L1\times N2)\}^2$, where L1 is a length of the rod electrodes of the first pre-rod section, L2 is a length of the rod electrodes of the second pre-rod section, N1 is a number of periods of the RF voltage corresponding to a length of time during which ions pass through the first pre-rod section, and N2 is a number of periods of the RF voltage corresponding to a length of time during which ions pass through the second pre-rod section.

21. The quadrupole mass spectrometer according to claim 20, further comprising a parameter adjustment section configured to perform an adjustment for optimizing parameters by changing each of the DC bias voltages $V_{B1}$ and $V_{B2}$ while maintaining a relationship of $V_{B2}/V_{B1}=\{(L2\times N1)/(L1\times N2)\}^2$ between the DC bias voltages $V_{B1}$ and $V_{B2}$.

22. The quadrupole mass spectrometer according to claim 9, further comprising an ion injection lens configured to reduce a spread of ions around the central axis in front of the pre-rod section located closest to a front end in the quadrupole mass filter.

23. The quadrupole mass spectrometer according to claim 9, further comprising a control section configured to perform an adjustment in which at least one voltage applied from the auxiliary voltage application section to each rod electrode of the first pre-rod section is adjusted in a vicinity of a preset value, based on an ion intensity signal obtained with a detector, where the at least one voltage is either the RF voltage or DC voltage for creating a quadrupole electric field or a DC bias voltage.

* * * * *